United States Patent
Perdue et al.

(10) Patent No.: US 10,351,394 B2
(45) Date of Patent: Jul. 16, 2019

(54) LOAD ASSEMBLY AND METHOD FOR LIFTING A LOAD INTO AN AIRCRAFT

(71) Applicant: Gulfstream Aerospace Corporation, Savannah, GA (US)

(72) Inventors: James E. Perdue, Savannah, GA (US); Quent Mikeal, Savannah, GA (US); Bret Bell, Savannah, GA (US); Coleda Darney, Rincon, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 265 days.

(21) Appl. No.: 15/188,655

(22) Filed: Jun. 21, 2016

(65) Prior Publication Data

US 2017/0081044 A1  Mar. 23, 2017

Related U.S. Application Data

(60) Provisional application No. 62/222,011, filed on Sep. 22, 2015.

(51) Int. Cl.

| | |
|---|---|
| *B64F 5/50* | (2017.01) |
| *B66C 11/12* | (2006.01) |
| *B66C 7/06* | (2006.01) |
| *B64F 5/00* | (2017.01) |
| *B66C 11/06* | (2006.01) |
| *B64F 5/40* | (2017.01) |
| *B64D 9/00* | (2006.01) |

(52) U.S. Cl.
CPC ............. *B66C 11/12* (2013.01); *B64D 9/00* (2013.01); *B64F 5/00* (2013.01); *B64F 5/40* (2017.01); *B64F 5/50* (2017.01); *B66C 7/06* (2013.01); *B66C 11/06* (2013.01)

(58) Field of Classification Search
CPC ...... B64F 5/0036; B64F 5/0081; B66C 11/06; B66C 7/06; B66C 11/12
See application file for complete search history.

(56) References Cited

U.S. PATENT DOCUMENTS

| | | | |
|---|---|---|---|
| 2,465,796 A | 3/1949 | Freeman | |
| 3,999,630 A * | 12/1976 | McPhee | B64D 11/0007 186/40 |
| 6,547,061 B2 * | 4/2003 | Gasal | B64C 1/20 198/746 |
| 8,201,809 B2 | 1/2012 | Bolton | |

* cited by examiner

*Primary Examiner* — Rick K Chang
(74) *Attorney, Agent, or Firm* — LKGlobal | Lorenz & Kopf, LLP

(57) ABSTRACT

A load assembly for use with an aircraft includes a support sub-assembly and a lifting sub-assembly. The support sub-assembly is configured for removable coupling to a structural member of the aircraft. The structural member has a first interior position and a second interior position. The support sub-assembly extends between the first interior position and the second interior position. The lifting sub-assembly is movably coupled to the support sub-assembly. The lifting sub-assembly is movable along the support sub-assembly between the first interior position and the second interior position and configured to lift or lower a load, and to support the load as the lifting sub-assembly moves along the support sub-assembly between the first interior position and the second interior position.

8 Claims, 22 Drawing Sheets

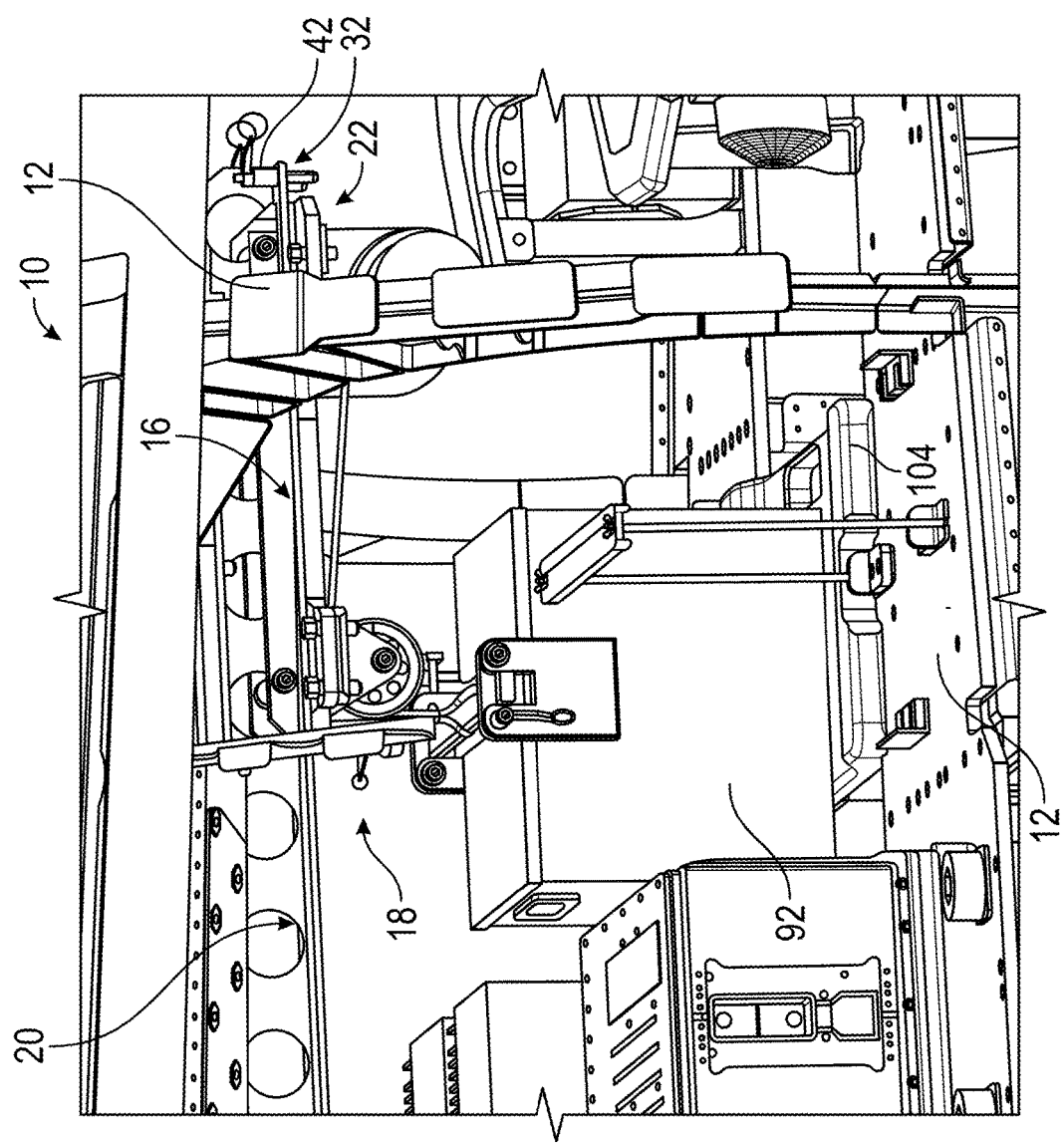

LOAD ASSEMBLY AND METHOD FOR LIFTING A LOAD INTO AN AIRCRAFT

CROSS-REFERENCE TO RELATED APPLICATION(S)

This application claims priority to provisional application No. 62/222,011, filed on Sep. 22, 2015 and entitled "Battery Installation System." The contents of which are incorporated herein by reference in its entirety.

TECHNICAL FIELD

The present invention generally relates to aircraft and more particularly relates to aircraft manufacturing, testing, and maintenance.

BACKGROUND

Aircraft commonly include one or more batteries that must be regularly removed and replaced for maintenance and service purposes. These batteries are typically heavy (e.g. 90 lbs.) and are located in areas of the aircraft that are difficult to access. For example, in the Gulfstream G650 aircraft, one battery is located in a forward section of its interior and two additional batteries are located in an aft section of its interior. In the past, a worker would manually carry the battery up or down a ladder to load the battery into the aircraft or to remove the battery from the aircraft. Because of the battery's weight, this was undesirable. To address this issue, some workers now use a lift located outside the aircraft to raise the battery into the aircraft or to lower the battery out of the aircraft.

While this solution is adequate, there is room for improvement. This is because the lift is located outside the aircraft and therefore does not help the worker move the battery through the aircraft's interior. To move the battery through the interior of the aircraft, a technician must lift and carry the battery by hand. While carrying the battery, the technician must move through small pathways in the interior by utilizing non-ergonomic positions while avoiding bodily injury and damage to sensitive equipment already on-board the aircraft. For these reasons, it is undesirable for a technician to carry a battery by hand.

Accordingly, it is desirable to provide a load assembly and a method for lifting a load into an aircraft. Furthermore, other desirable features and characteristics will become apparent from the subsequent summary and detailed description and the appended claims, taken in conjunction with the accompanying drawings and the foregoing technical field and background.

BRIEF SUMMARY

Various non-limiting embodiments of a load assembly for use with an aircraft, and various non-limiting embodiments of a method for lifting a load into the aircraft, are disclosed herein.

In a first non-limiting embodiment, the load assembly includes, but is not limited to, a support sub-assembly configured for removable coupling to a structural member of the aircraft. The structural member has a first interior position and a second interior position. The support sub-assembly extends between the first interior position and the second interior position. The load assembly further includes a lifting sub-assembly movably coupled to the support sub-assembly. The load assembly further includes, but is not limited to, a lifting sub-assembly. The lifting sub-assembly is movable along the support sub-assembly between the first interior position and the second interior position and is configured to lift and lower the load and to support the load as the lifting sub-assembly moves along the support sub-assembly between the first interior position and the second interior position.

In a second non-limiting embodiment, the method includes, but is not limited to, the step of coupling the support sub-assembly to a structural member of the aircraft. The method further includes, but is not limited to, the step of coupling the lifting sub-assembly to the support sub-assembly. The method further includes, but is not limited to, the step of coupling the load to the lifting sub-assembly. The method further includes, but is not limited to, the step of activating the lifting sub-assembly to lift the load. The method further includes, but is not limited to the step of moving the lifting sub-assembly from a first interior position to a second interior position.

BRIEF DESCRIPTION OF THE DRAWINGS

The present invention will hereinafter be described in conjunction with the following drawing figures, wherein like numerals denote like elements, and FIG. 1 a fragmentary perspective view illustrating an aircraft and a first non-limiting embodiment of a load assembly;

FIGS. 16A and 16B are fragmentary perspective views illustrating steps of activating the lifting sub-assembly in the aft section of the aircraft;

DETAILED DESCRIPTION

Figure 1:
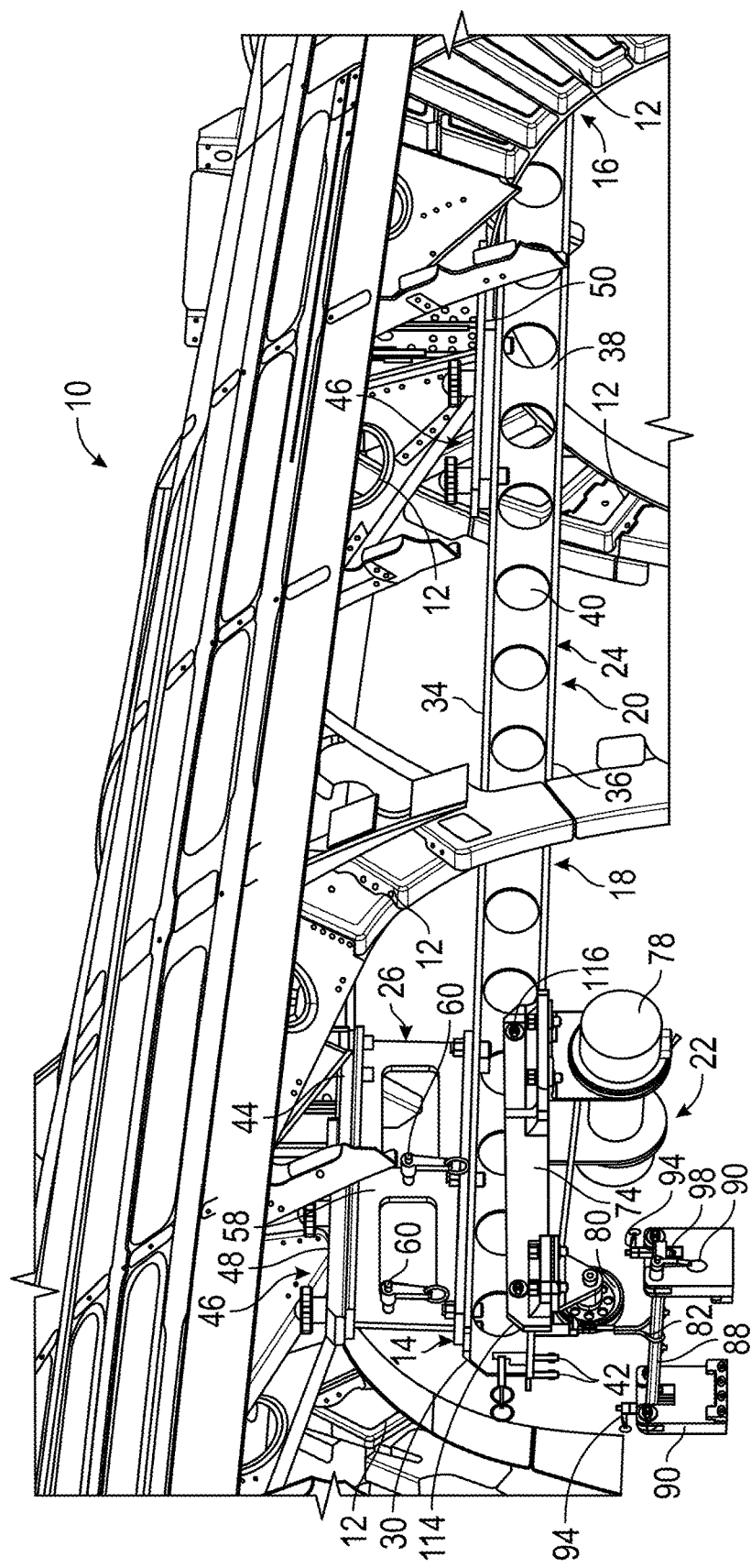

The following detailed description is merely exemplary in nature and is not intended to limit the invention or the application and uses of the invention. Furthermore, there is no intention to be bound by any theory presented in the preceding background or the following detailed description.

A load assembly for lifting or lowering a load in an aircraft is taught herein. In an exemplary embodiment, the load assembly is configured to be modular such that the load assembly can be utilized in the aircraft during maintenance or service of the aircraft, and removed from the aircraft prior to flight. The load assembly includes a support sub-assembly and a lifting sub-assembly. The support sub-assembly is configured for being removably coupled to a structural member of the aircraft with the structural member having a first interior position and a second interior position. The support sub-assembly includes a beam portion and a fixed spacer portion extending transversely from the beam portion. When the support sub-assembly is to be utilized in an aft section of the aircraft, each of the beam portion and the fixed spacer portion are configured for removable coupling to the structural member of the aircraft. When the support sub-assembly is to be utilized in a forward section of the aircraft, the support sub-assembly further includes a forward extender removably coupled to the fixed spacer portion and an aft extender removably coupled to the beam portion. The forward extender and the aft extender are configured for removable coupling to the structural member of the aircraft.

The lifting sub-assembly is movably coupled to the support sub-assembly. The lifting sub-assembly is movable along the support sub-assembly between the first interior position and the second interior position and configured to lift or lower the load in the aircraft. The lifting sub-assembly is also movable along the support sub-assembly between the first interior position and the second interior position to support the load as the lifting sub-assembly moves along the support sub-assembly between the first interior position and the second interior position.

In an embodiment, the lifting sub-assembly includes a winch and a cable bar with a cable coupling the cable bar to the winch. The lifting sub-assembly further includes a joining device removably coupled to the cable bar. The joining device is configured for removable coupling to the load. The winch is configured to extend and retract the cable for raising and lowering the load.

When the load assembly is to be utilized in the aft section of the aircraft, the load assembly includes a shelf disposed in the aft section of the aircraft. The shelf is utilized as a temporary support for supporting the load when the load is installed or removed from the aircraft. The shelf is disposed in line with the second interior position of the structural member for lifting the load from the shelf to the lifting sub-assembly, or lowering the load from the lifting sub-assembly to the shelf, when the lifting sub-assembly is in the second interior position.

In a first exemplary embodiment, the load assembly may be utilized to service an aft battery of the aircraft, as follows. Although the context of the discussion below pertains to lifting and positioning a battery in an aircraft, it should be understood that the load assembly disclosed herein is not limited to use only with batteries nor for use only on aircraft. Rather, the load assembly disclosed and described herein may be employed to lift and position any other suitable load within any type of vehicle or structure. The beam portion and the fixed spacer portion of the support sub-assembly are coupled to the structural member of the aircraft. The lifting sub-assembly is coupled to the support sub-assembly. The joining devices are coupled to the aft battery and the cable bar is coupled to the joining devices. The lifting sub-assembly is activated to lift the aft battery from the exterior of the aircraft into the aircraft. The lifting sub-assembly is moved from the first interior position to the second interior position. The lifting sub-assembly is activated to lower the aft battery to the shelf. The lifting sub-assembly is released from the aft battery. The aft battery is moved along the shelf to an interior surface of the aircraft. The load assembly is removed from the aircraft.

In a second exemplary embodiment, the load assembly may be utilized to service a forward battery of the aircraft, as follows. The forward extender and the aft extender of the support sub-assembly are coupled to the structural member of the aircraft. The beam portion is coupled to the forward extender and the fixed spacer portion is coupled to the aft extender. The lifting sub-assembly is coupled to the support sub-assembly. The joining devices are coupled to the forward battery and the cable bar is coupled to the joining devices. The lifting sub-assembly is activated to lift the forward battery from the exterior of the aircraft into the aircraft. The lifting sub-assembly is moved from the first interior position to the second interior position. The lifting sub-assembly is activated to lower the forward battery to an interior surface of the aircraft the shelf. The lifting sub-assembly is released from the forward battery. The load assembly is removed from the aircraft.

A greater understanding of the load assembly described above and of the method for lifting a load into the aircraft may be obtained through a review of the illustrations accompanying this application together with a review of the detailed description that follows.

FIG. 1 is a non-limiting embodiment of a fragmentary perspective view illustrating an aircraft 10 having a plurality of structural members 12. In certain embodiments, the plurality of structural member 12 as illustrated in FIG. 1 is located in an aft section of the aircraft 10. The plurality of structural members 12 are commonly referred to as bulkheads. The plurality of structural members 12 typically extends throughout the aircraft 10 for providing structural integrity to the aircraft 10. The plurality of structural members 12 as illustrated in FIG. 1 extend between a first interior position 14 and a second interior position 16. Skin and structure of the aircraft 10 has been removed in FIG. 1 for clarity purposes. Also illustrated in FIG. 1 is a non-limiting embodiment of a load assembly 18. The load assembly 18 is illustrated while coupled to the plurality of structural members 12. The load assembly 18 includes a support sub-assembly 20 and a lifting sub-assembly 22. The support sub-assembly 20 is configured for removable coupling to the structural member 12 of the aircraft 10. The support sub-assembly 20 extends between the first interior position 14 and the second interior position 16 of the structural member 12. The lifting sub-assembly 22 is movable along the support sub-assembly 20 between the first interior position 14 and the second interior position 16 and configured to lift or lower a load 92 (not shown in FIG. 1) in the aircraft 10. The lifting sub-assembly 22 is also movable along the support sub-assembly 20 between the first interior position 14 and the second interior position 16 to support the load 92 as the lifting sub-assembly 22 moves along the support sub-assembly 20 between the first interior position 14 and the second interior position 16. As will be described in greater detail below, the load assembly 18 illustrated in FIG. 1 is configured for aft battery installation or removal.

Figure 2:
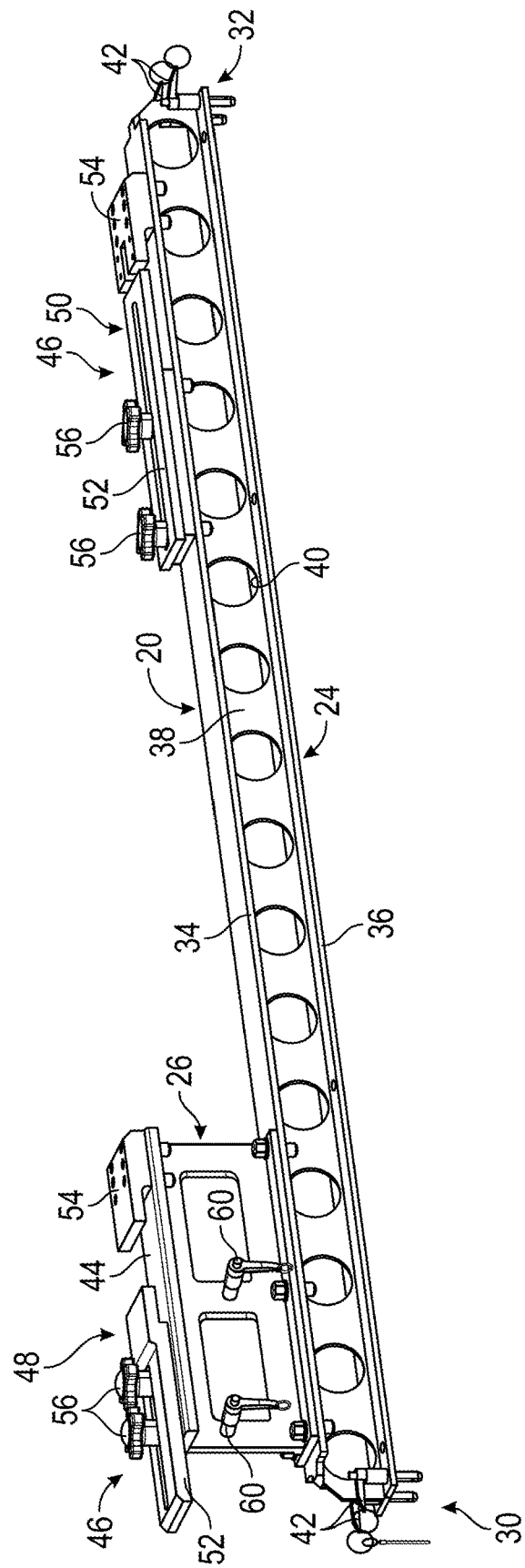
FIG. 2 is a perspective view illustrating a support sub-assembly of the load assembly of FIG. 1 in an operation state.

FIG. 2 is a perspective view illustrating the support sub-assembly 20 of FIG. 1 in an operation state. The support sub-assembly 20 includes a beam portion 24 and a fixed spacer portion 26 extending transversely from the beam portion 24. The beam portion 24 is generally linear extending between a first beam end 30 and a second beam end 32. The beam portion 24 includes a top flange 34 and a bottom flange 36 with a web 38 disposed therebetween. The web 38 defines a plurality of web openings 40 between the first beam end 30 and the second beam end 32 for reducing weight of the beam portion 24. The bottom flange 36 of the beam portion 24 includes locking pins 42 adjacent the first beam end 30 and adjacent the second beam end 32. The fixed spacer portion 26 is adjacent the first beam end 30 and extends transversely from the top flange 34 to a fixed spacer surface 44.

The support sub-assembly 20 includes one or more retainer clamps 46 configured to engage an individual structural member of the plurality of structural members 12 for removably coupling the support sub-assembly 20 to the plurality of structural members 12. The one or more retainer clamps 46 includes a forward retainer clamp 48 and an aft retainer clamp 50. The fixed spacer portion 26 includes the forward retainer clamp 48 with the forward retainer clamp 48 disposed on the fixed spacer surface 44 of the fixed spacer portion 26 adjacent the first beam end 30. The beam portion 24 includes the aft retainer clamp 50 with the aft retainer clamp 50 disposed on the beam portion 24 adjacent the second beam end 32.

Each of the one or more retainer clamps 46 includes an adjustable clamp portion 52 and a fixed clamp portion 54. The adjustable clamp portion 52 is removably coupled to the support sub-assembly 20 with fasteners 56 that are threaded to engage the support sub-assembly 20. The fasteners 56 may be further defined as hand knobs. The fixed clamp portion 54 is generally fixedly coupled to the support sub-assembly 20. The adjustable clamp portion 52 and the fixed clamp portion 54 are configured to engage opposing sides of the structural member 12 of the aircraft 10 for securing the support sub-assembly 20 to the structural member 12.

Figure 3:
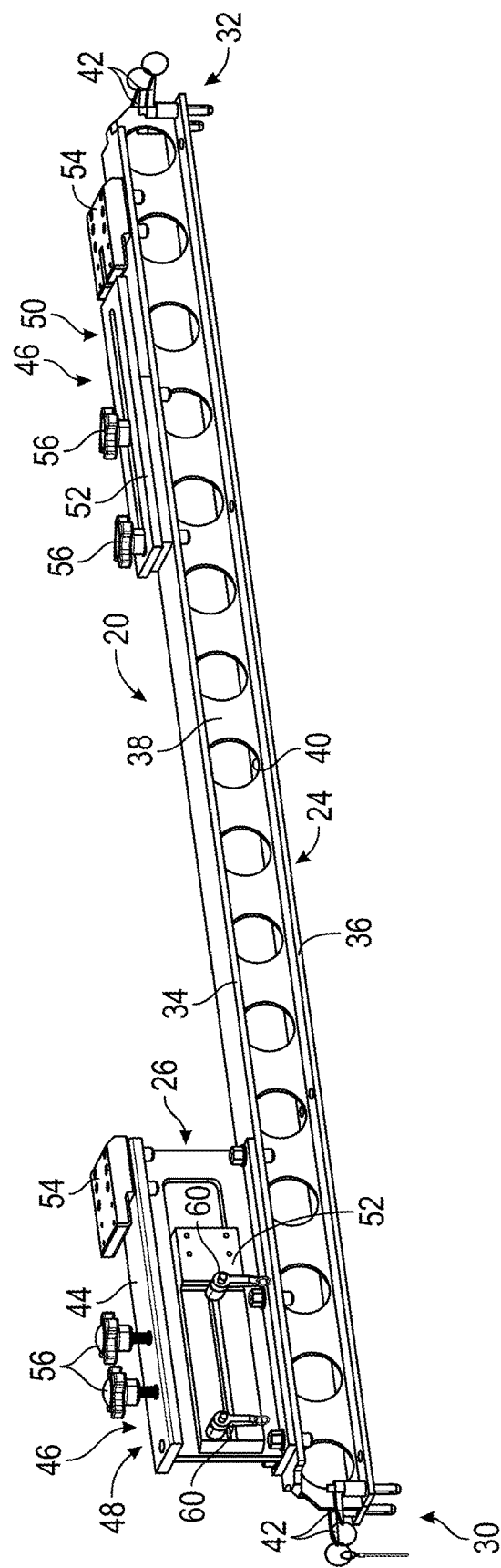
FIG. 3 is a perspective view illustrating the support sub-assembly of FIG. 2 in a storage state.

FIG. 3 is a perspective view illustrating the support sub-assembly 20 of FIG. 2 in a storage state. When the support sub-assembly 20 is in the storage state, the adjustable clamp portion 52 of the forward retainer clamp 48 is removed from the fixed spacer surface 44 of the fixed spacer portion 26 and coupled to a side surface 58 of the fixed spacer portion 26 with retaining pins 60. The retaining pins 60 may be further defined as ball lock pins.

Figure 4A:
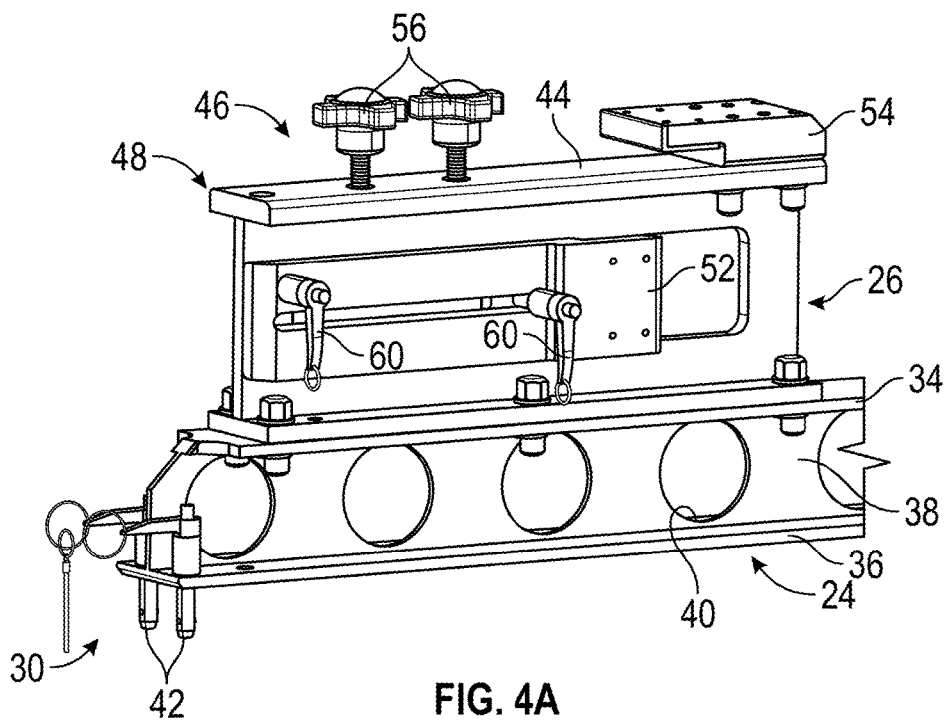
FIGS. 4A, 4B, and 4C are magnified perspective views illustrating a fixed spacer portion of the support sub-assembly in the storage state of FIG. 3 transitioning to the operational state of FIG. 2.
Figure 4B:
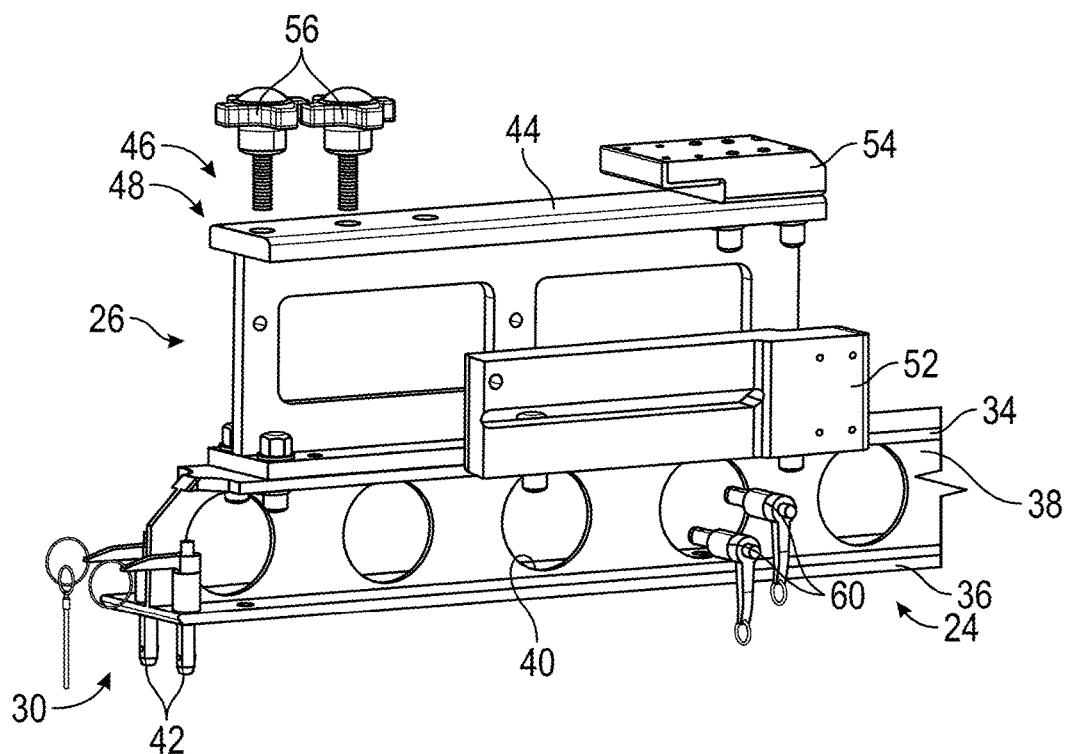
Figure 4C:
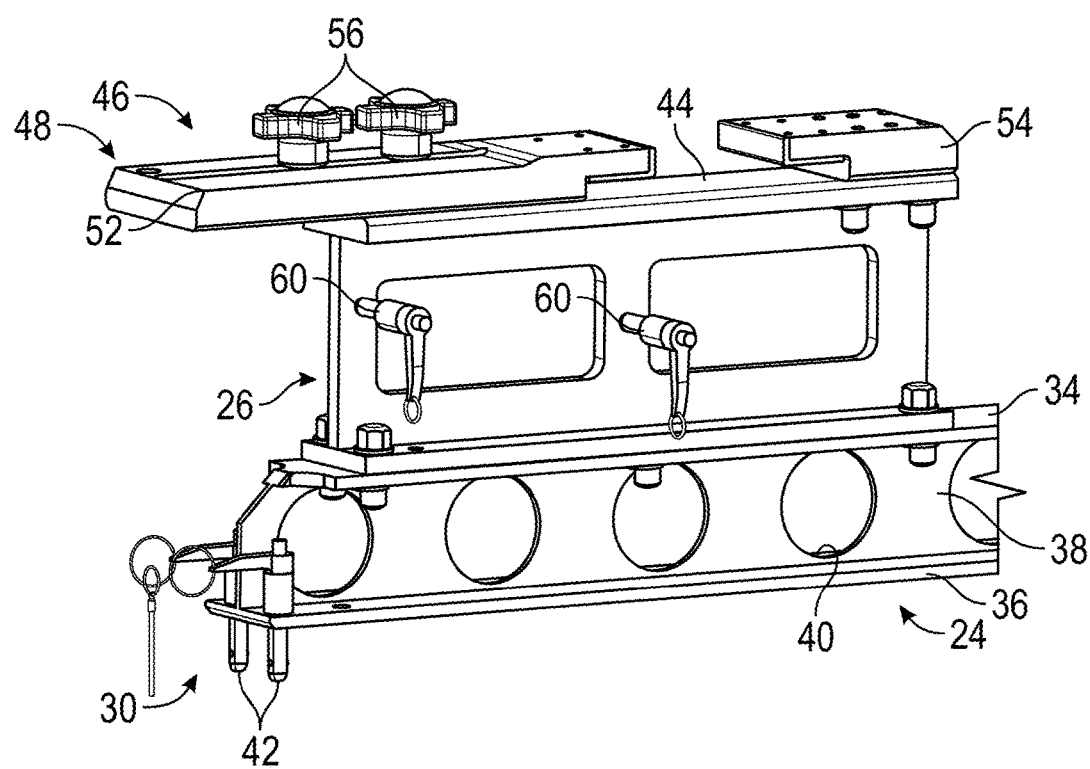

FIGS. 4A, 4B, and 4C are magnified perspective views illustrating the fixed spacer portion 26 of the support sub-assembly 20 in the storage state of FIG. 3 transitioning to the operational state of FIG. 2. Referring specifically to FIG. 4A, the adjustable clamp portion 52 of the forward retainer clamp 48 is coupled to the side surface 58 of the fixed spacer portion 26 with retaining pins 60. Referring specifically to FIG. 4B, the adjustable clamp portion 52 of the forward retainer clamp 48 is transitioning from the side surface 58 of the fixed spacer portion 26 to the fixed spacer surface 44 of the fixed spacer portion 26. Referring specifically to FIG. 4C, the adjustable clamp portion 52 of the forward retainer clamp 48 is coupled to the fixed spacer surface 44 of the fixed spacer portion 26 with the fasteners 56.

Figure 5:
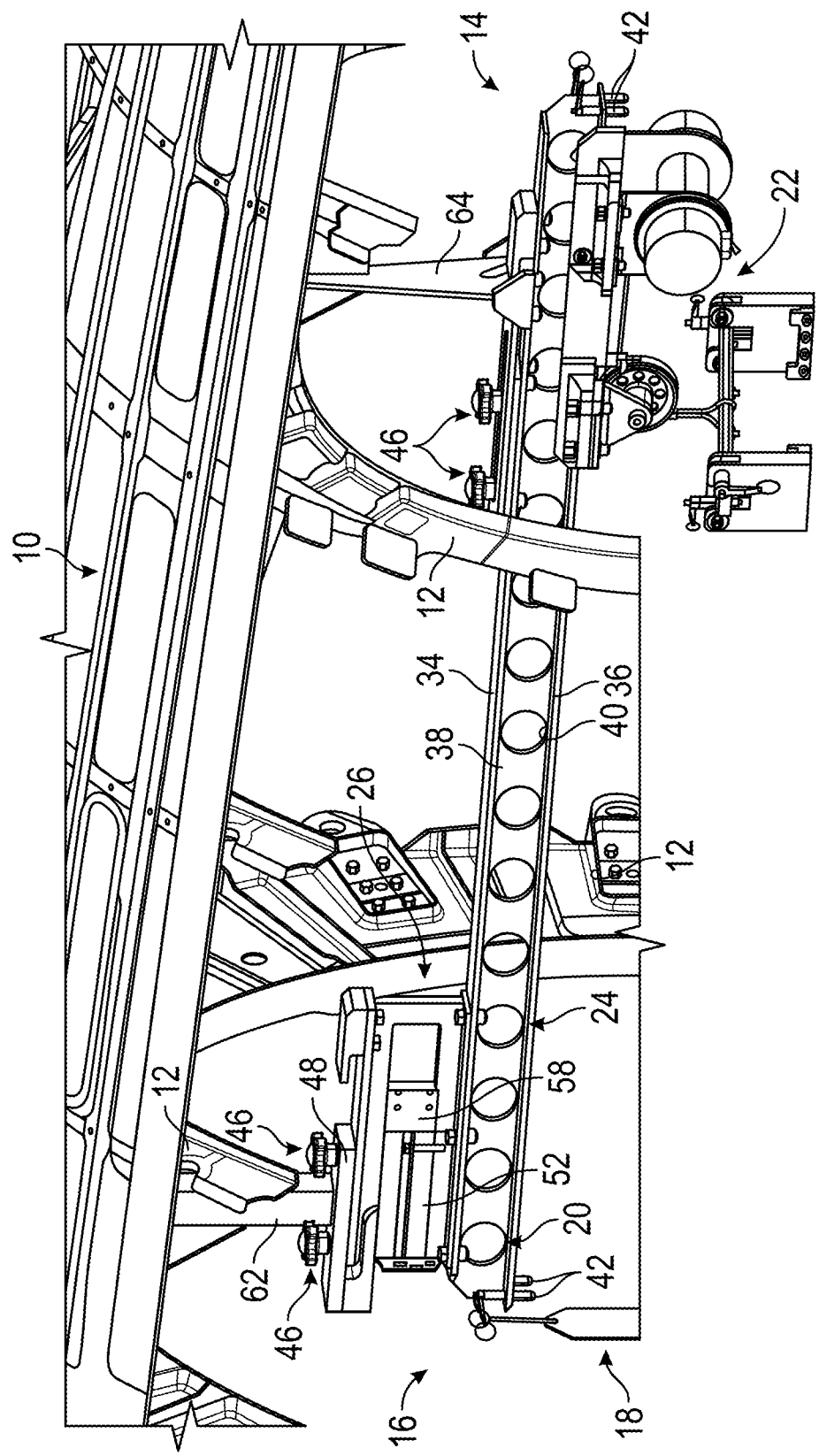
FIG. 5 is a fragmentary perspective view illustrating the aircraft and a second non-limiting embodiment of the load assembly.

FIG. 5 is a fragmentary perspective view illustrating the aircraft 10 having the plurality of structural members 12. In certain embodiments, the plurality of structural members 12 as illustrated in FIG. 5 are located in a forward section of the aircraft 10. One structural member of the plurality of structural members 12 is disposed at a first interior position 14 and another structural member of the plurality of structural members 12 is disposed at a second interior position 16. Once again, skin and structure of the aircraft 10 has been removed in FIG. 5 for clarity purposes. Also illustrated in FIG. 5 is the second non-limiting embodiment of the load assembly 18 including the support sub-assembly 20 and the lifting sub-assembly 22. In this embodiment, the support sub-assembly 20 of the load assembly 18 includes a forward extender 62 and an aft extender 64 for removable coupling the support sub-assembly 20 to the plurality of structural members 12 of the aircraft 10. As will be described in greater detail below, the load assembly 18 illustrated in FIG. 5 is configured for forward battery installation or removal.

Figure 6:
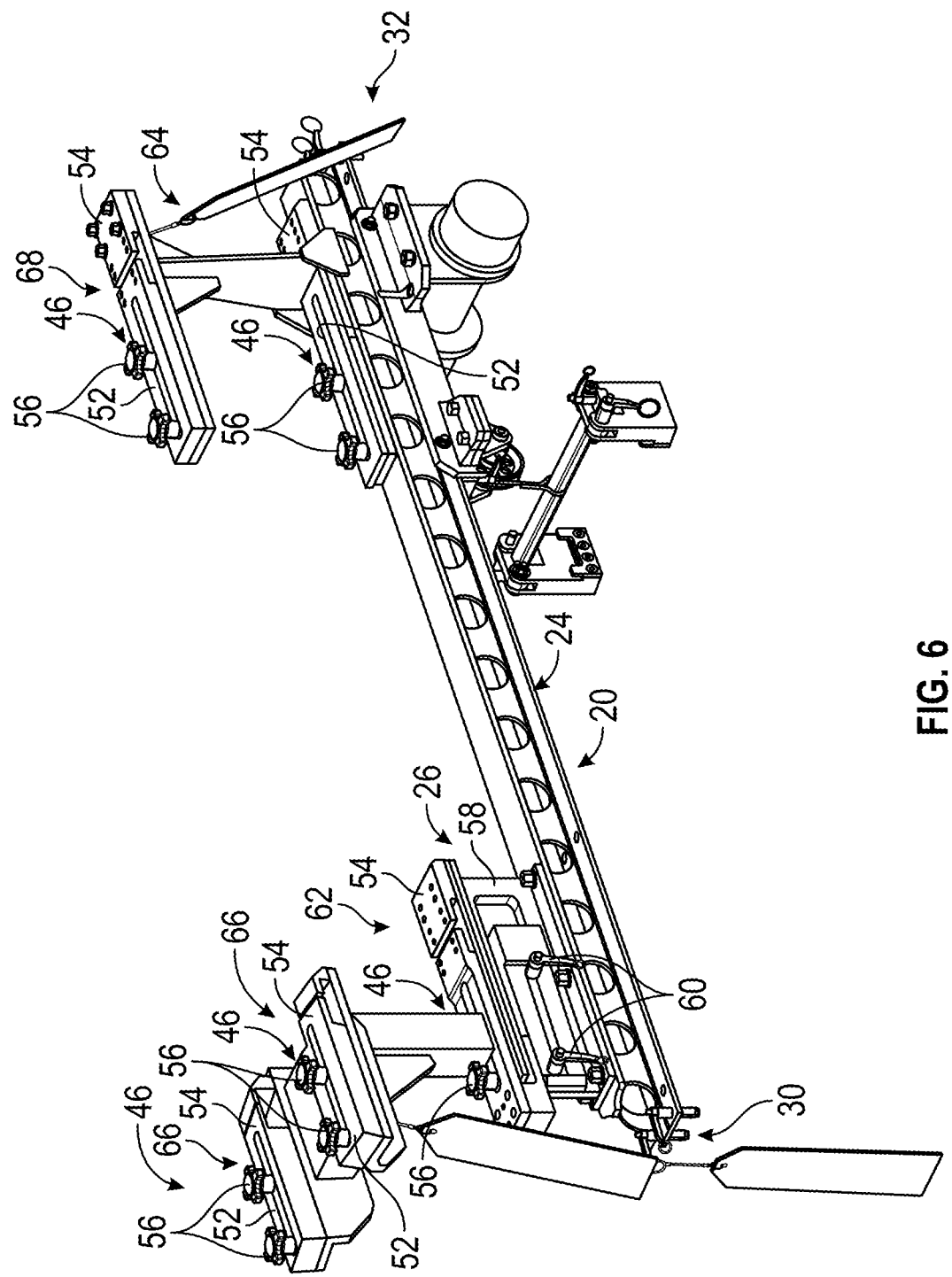
FIG. 6 is a perspective view illustrating the support sub-assembly of FIG. 5 in an operation state.

FIG. 6 is a perspective view illustrating the support sub-assembly 20 of FIG. 5 in an operation state. The forward extender 62 is configured to engage the forward retainer clamp 48 for removable coupling the forward extender 62 to the fixed spacer portion 26 adjacent the first beam end 30. Specifically, when the forward extender 62 is utilized, the adjustable clamp portion 52 of the forward retainer clamp 48 is removed from the fixed spacer surface 44 of the fixed spacer portion 26 and coupled to the side surface 58 of the fixed spacer portion 26 with retaining pins 60. The forward extender 62 engages the fixed clamp portion 54 of the forward retainer clamp 48 and is coupled to the fixed spacer surface 44 with the fasteners 56. The aft extender 64 is configured to engage the aft retainer clamp 50 for removably coupling the aft extender 64 to the beam portion 24 adjacent the second beam end 32. Specifically, when the aft extender 64 is utilized, the aft extender 64 engages the fixed clamp portion 54 of the aft retainer clamp 50 and is coupled to the beam portion 24 with adjustable clamp portion 52 of the aft retainer clamp 50.

The forward extender 62 includes one or more of the retainer clamps 46, such as a forward extender retainer clamp 66. More specifically, the forward extender 62 includes two forward extender retainer clamps 66. The forward extender retainer clamps 66 of the forward extender 62 are each spaced from the forward retainer clamp 48 of the fixed spacer portion 26. Each of the forward extender retainer clamps 66 includes the adjustable clamp portion 52 and the fixed clamp portion 54. Each of the adjustable clamp portions 52 of the forward extender retainer clamps 66 are removably coupled to the forward extender 62 with the fasteners 56 which are threaded to engage the forward extender 62. The fixed clamp portion 54 is generally fixedly coupled to the forward extender 62. The adjustable clamp portion 52 and the fixed clamp portion 54 of the forward extender retainer clamps 66 are configured to engage opposing sides of an individual structural member of the plurality of structural members 12 for securing the forward extender 62 to the individual structural member.

The aft extender 64 includes one or more of the retainer clamps 46. More specifically, the aft extender 64 includes an aft extender retainer clamp 68. The aft extender retainer clamp 68 of the aft extender 64 is spaced from the aft retainer clamp 50 of the beam portion 24. The aft extender retainer clamp 68 includes the adjustable clamp portion 52 and the fixed clamp portion 54. The adjustable clamp portion 52 of the aft extender retainer clamp 68 is removably coupled to the aft extender 64 with the fasteners 56 which are threaded to engage the aft extender 64. The fixed clamp portion 54 is generally fixedly coupled to the aft extender 64. The adjustable clamp portion 52 and the fixed clamp portion 54 of the aft extender retainer clamp 68 is configured to engage opposing sides of the structural member 12 of the aircraft 10 for securing the aft extender 64 to the structural member 12.

Figure 7A:
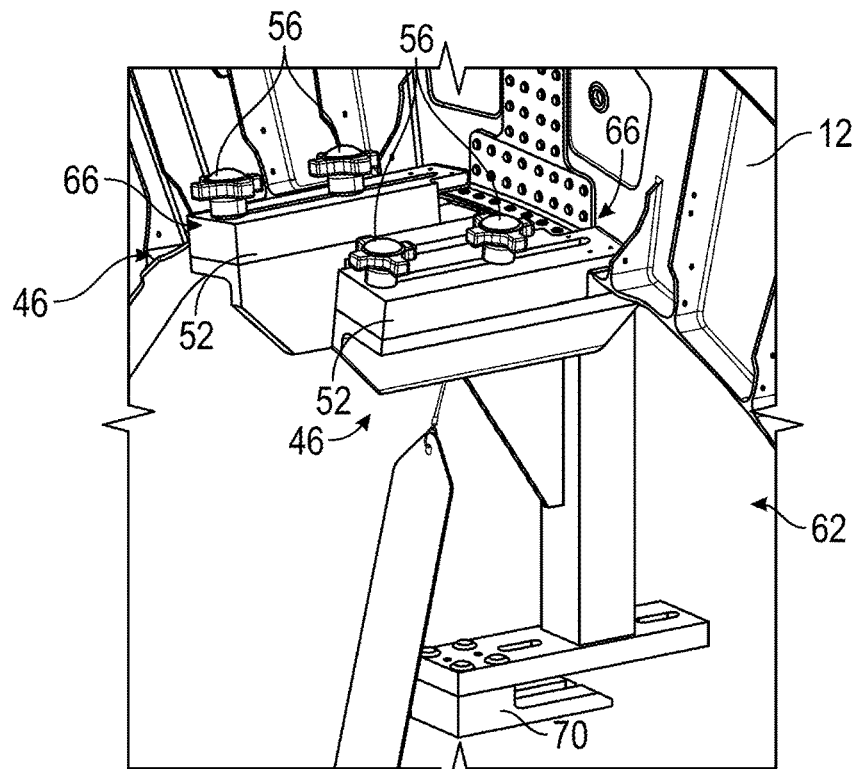
FIGS. 7A and 7B are fragmentary perspective views illustrating a forward extender of the support sub-assembly of FIG. 6.
Figure 7B:
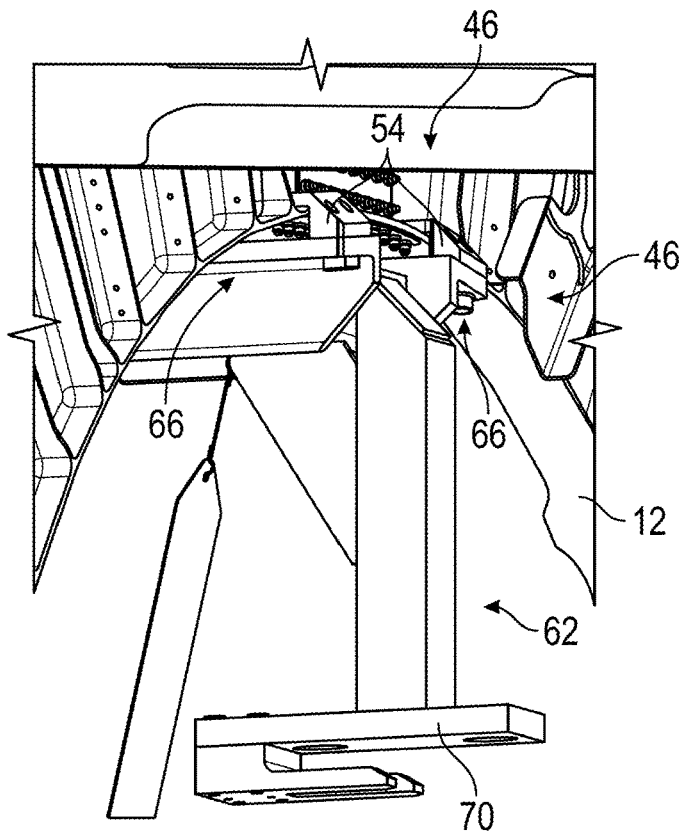

FIGS. 7A and 7B are fragmentary perspective views illustrating the forward extender 62 of FIG. 6. The forward extender 62, as illustrated in FIG. 7A with a view toward the aft section of the aircraft 10 and as illustrated in FIG. 7B with a view toward the forward section of the aircraft 10, is coupled to a structural member of the plurality of structural members 12. The forward extender 62 includes a forward locking member 70 configured to engage the fixed clamp portion 54 of the forward retainer clamp 48 and be coupled to the fixed spacer surface 44 with the fasteners 56.

Figure 8A:
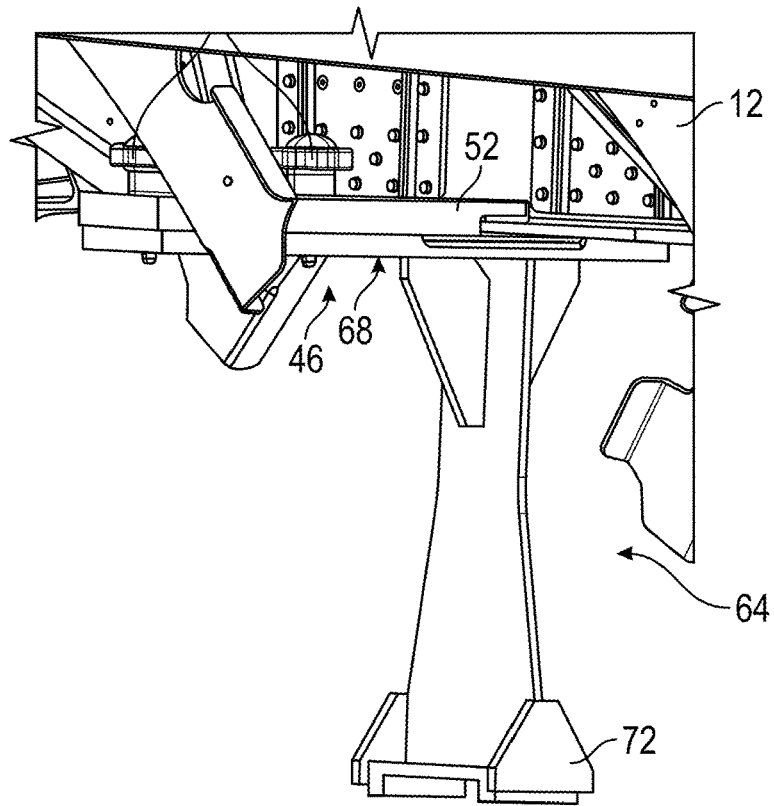
FIGS. 8A and 8B are fragmentary perspective views illustrating an aft extender of the support sub-assembly of FIG. 6.
Figure 8B:
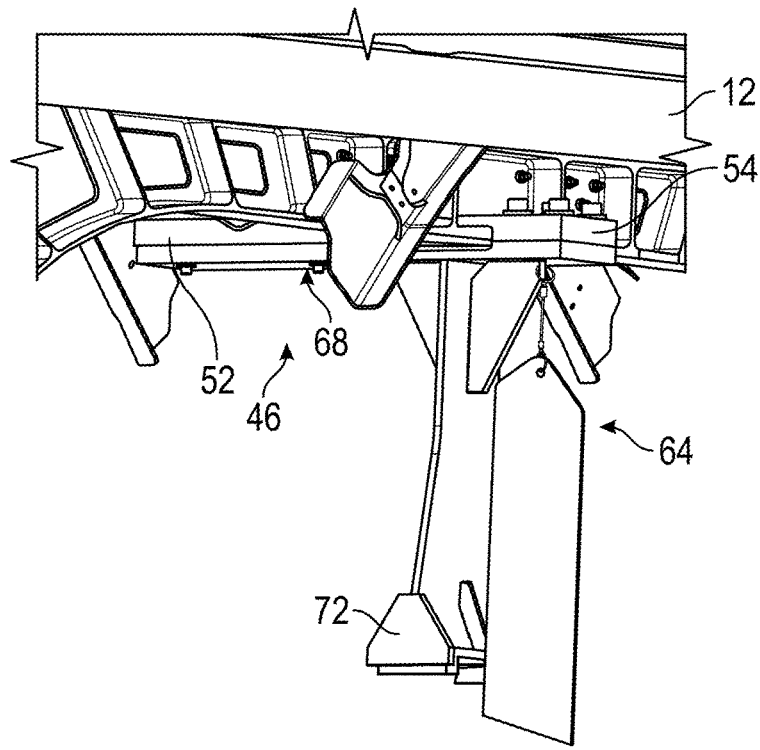

FIGS. 8A and 8B are fragmentary perspective views illustrating the aft extender 64 of FIG. 6. The aft extender 64, as illustrated in FIG. 8A with a view toward the aft section of the aircraft 10 and as illustrated in FIG. 8B with a view toward the forward section of the aircraft 10, is coupled to a structural member of the plurality of structural members 12. The aft extender 64 includes an aft locking member 72 configured to engage the fixed clamp portion 54 of the aft retainer clamp 50 and to be coupled to the beam portion 24 of the support sub-assembly 24 with adjustable clamp portion 52 of the aft retainer clamp 50.

Figure 9:
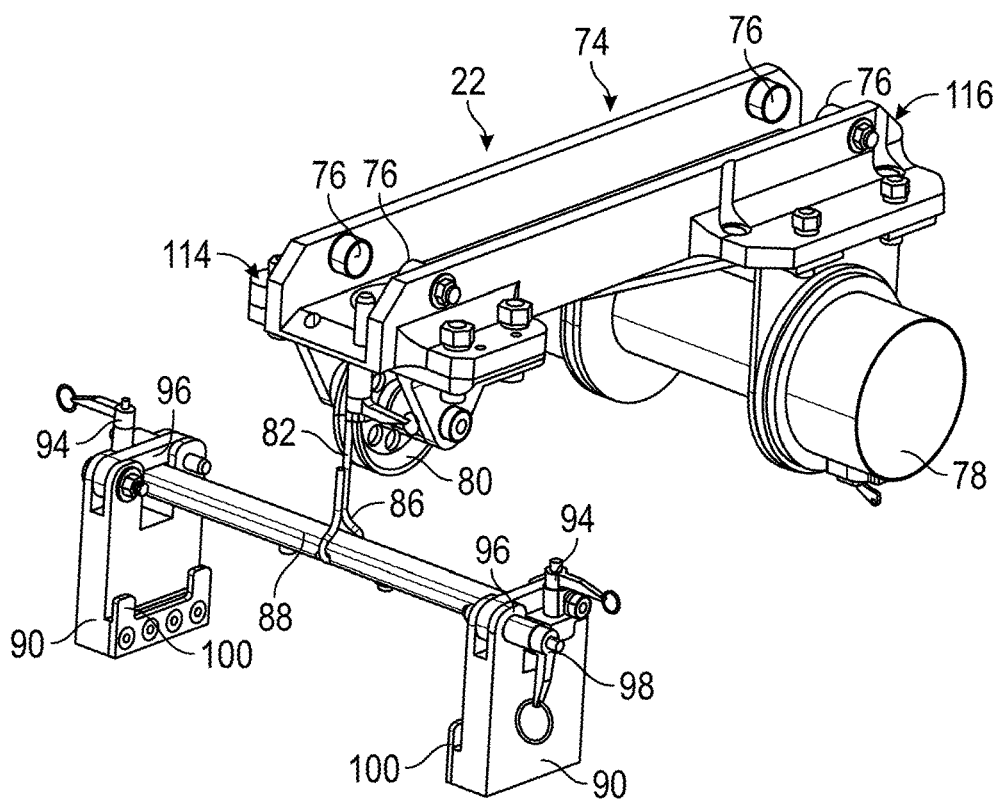
FIG. 9 is a perspective view illustrating a lifting sub-assembly of the load assembly of FIGS. 1 and 5.

FIG. 9 is a perspective view illustrating the lifting sub-assembly 22 of FIGS. 1 and 5. As introduced above, the lifting sub-assembly 22 is movable along the support sub-assembly 20 between the first interior position 14 and the second interior position 16 (see FIGS. 1 and 5) and configured to lift or lower the load 92 (not shown in FIG. 9). The lifting sub-assembly 22 is also movable along the support sub-assembly 20 between the first interior position 14 and the second interior position 16 to support the load 92 as the lifting sub-assembly 22 moves along the support sub-assembly 20 between the first interior position 14 and the second interior position 16. In certain embodiments, it is desirable to limit the weight of the lifting sub-assembly 22 in an effort to ease coupling of the lifting sub-assembly 22 to the support sub-assembly 20. In various embodiments, the lifting sub-assembly 22 has a weight of no greater than 40 lbs., no greater than 30 lbs., or no greater than 25 lbs.

The lifting sub-assembly 22 includes a cart 74 having a first cart end 114 and a second cart end 116. The cart 74 includes a plurality of gliders 76 configured to engage the support sub-assembly 20 such that the cart 74 is movable along the support sub-assembly 20 between the first interior position 14 and the second interior position 16 (see FIGS. 1 and 5). Specifically, the gliders 76 of the cart 74 are configured to engage the bottom flange 36 of the beam portion 24 of the support sub-assembly 20. In certain embodiments, the cart 74 includes two gliders 76 adjacent the first cart end 114 and two gliders 76 adjacent the second cart end 116 configured to engage the support sub-assembly 20.

The lifting sub-assembly 22 further includes a winch 78 coupled to the cart 74. The winch 78 includes a battery, such as an 18-volt battery, for energizing the winch 78. However, it is to be appreciated that the winch 78 may utilize any power source known in the art for energizing such winches. The winch 78 further includes a controller (not shown), which is operatively coupled to the winch 78 by a control cable (not shown), for operation of the winch 78. The winch 78 also includes a strain gauge (not shown), which couples the control cable to the winch 78, to prevent disengagement of the control cable from the winch 78. The winch 78 also includes a safety wire (not shown) coupled to a tension release (not shown) to prevent unintentional release of engagement the winch 78. In other embodiments, any other suitable winch may be employed.

The lifting sub-assembly 22 further includes a cable 82 having a first cable end 84 and a second cable end 86. The first cable end 84 is coupled to the winch 78. The winch 78 is configured to extend and retract the cable 82 for raising and lowering the load 92. The lifting sub-assembly 22 further includes a pulley 80 coupled to the cart 74. The second cable end 86 of the cable 82 extends through the pulley 80. The pulley 80 is spaced from the winch 78.

The lifting sub-assembly 22 further includes a cable bar 88 coupled to the second cable end 86. The lifting sub-assembly 22 further includes at least one joining device 90 removably coupled to the cable bar 88. In certain embodiments, two of the joining devices 90 are removably coupled to the cable bar 88. The cable bar 88 includes retaining pins 94 spaced from each other for preventing disengagement of the joining device 90 from the cable bar 88. The joining device 90 is configured for removable coupling to the load 92. The joining device 90 includes a latch portion 96 configured for securing the joining device 90 to the cable bar 88. The latch portion 96 is rotatable away from the cable bar 88 for disengaging the cable bar 88 from the joining device 90. The joining device 90 includes a retaining pin 98 which is configured to engage the joining device 90 and the latch portion 96 to secure the latch portion 96 to the joining device 90 such that the joining device 90 is secured to the cable bar 88. The joining device 90 is configured for removable coupling to the load 92. The joining device 90 includes an extension 100 configured to engage the load 92 for coupling the joining device 90 to the load 92.

Figure 10:
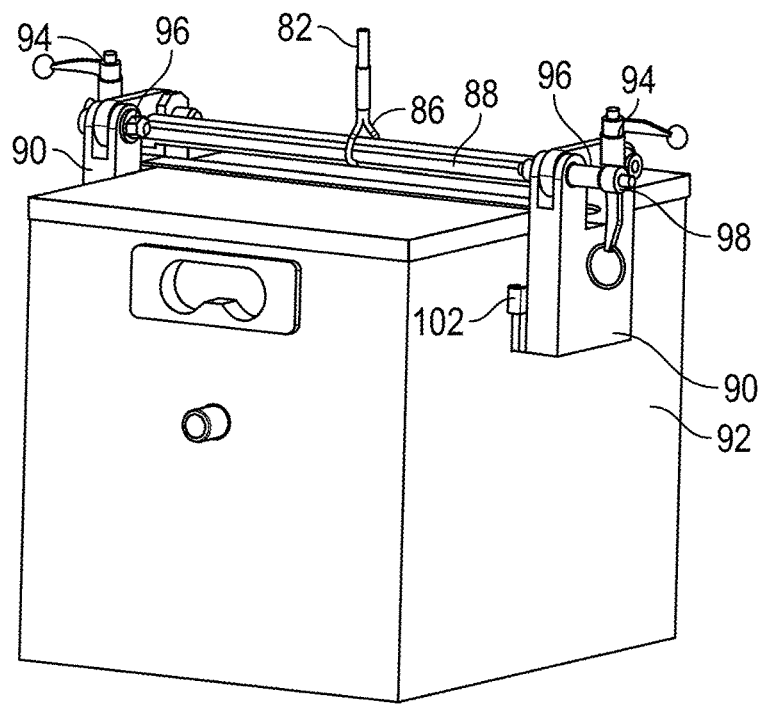
FIG. 10 is a fragmentary perspective view illustrating a portion of the lifting sub-assembly of FIG. 9 supporting a load.

FIG. 10 is a perspective view illustrating the cable bar 88, the joining device 90, and the load 92 of the lifting sub-assembly 22 of FIG. 9. The load 92 defines at least one slot 102 which is configured to be engaged by the extension 100 of the joining device 90. In FIG. 10, the load 92 defines two of the slots 102 with each of the slots 102 spaced from each other. The extension 100 of each of the joining devices 90 engages one of the slots 102 such that two of the joining devices 90 are coupled to the load 92. The cable bar 88, which is coupled to the cable 82, is also coupled to the joining devices 90 such that the load 92 is coupled to the cable bar 88 and thus coupled to the cable 82. As such, extension or retraction of the cable 82 by the winch 78 will result in movement, such as lifting or lowering, of the load 92.

Figure 11:
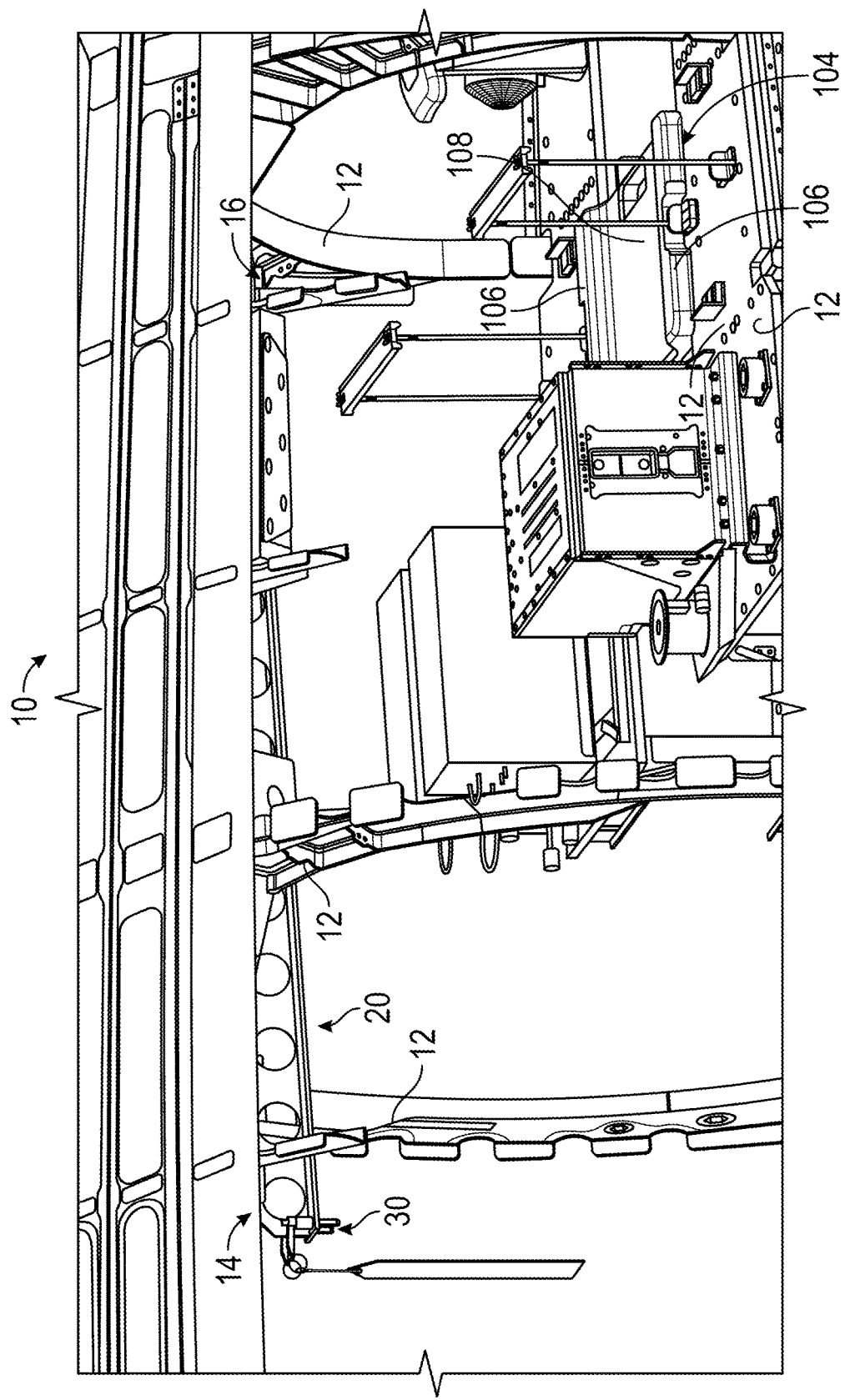
FIG. 11 is a fragmentary perspective view illustrating the load assembly including a shelf disposed in the aircraft.

FIG. 11 is a fragmentary perspective view illustrating the load assembly 18 including a shelf 104 disposed in the aircraft 10. In certain embodiments, the shelf 104 is disposed in the aft section of the aircraft 10. The shelf 104 is utilized as a temporary support for supporting the load 92 (e.g., the aft battery) when the aft battery is installed or removed from the aircraft 10. However, it is to be appreciated that the shelf 104 may be utilized in any section of the aircraft for supporting any type of load. In various embodiments, the shelf 104 can support a load having a weight of no greater than 125 lbs., no greater than 110 lbs., or no greater than 100 lbs. The shelf 104 is disposed inline with the second interior position 16 for lifting the load 92 from the shelf 104 to the lifting sub-assembly 22, or lowering the load 92 from the lifting sub-assembly 22 to the shelf 104, when the lifting sub-assembly 22 is in the second interior position 16. It is to be appreciated that the second interior position 16 may be inline with any interior surface of the aircraft.

Figure 12:
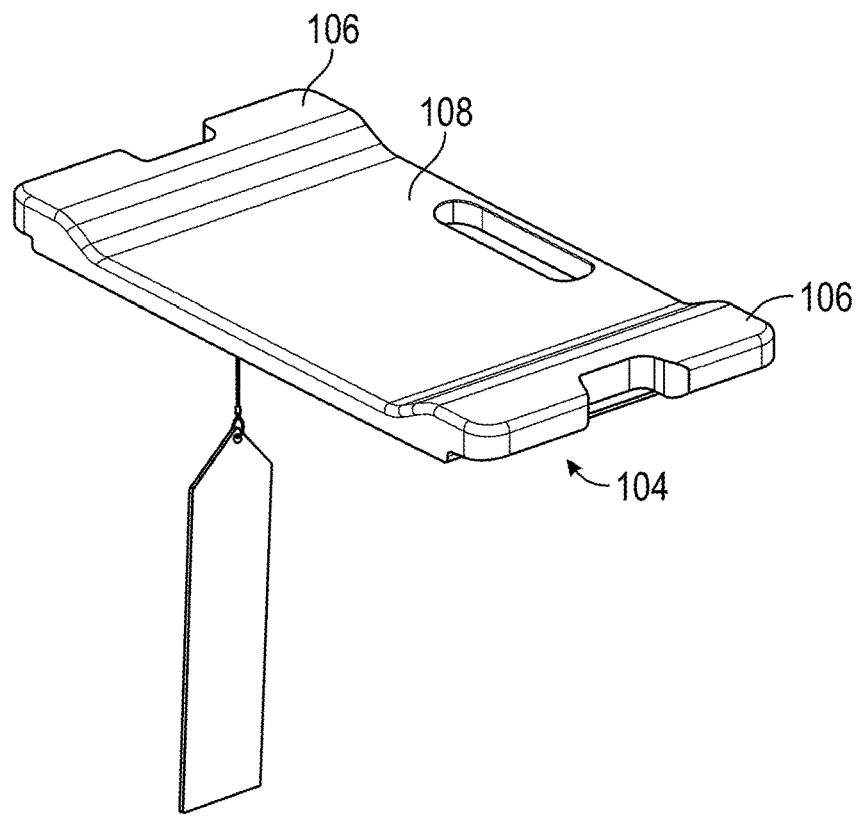
FIG. 12 is a perspective view illustrating the shelf of FIG. 11.
Figure 13:
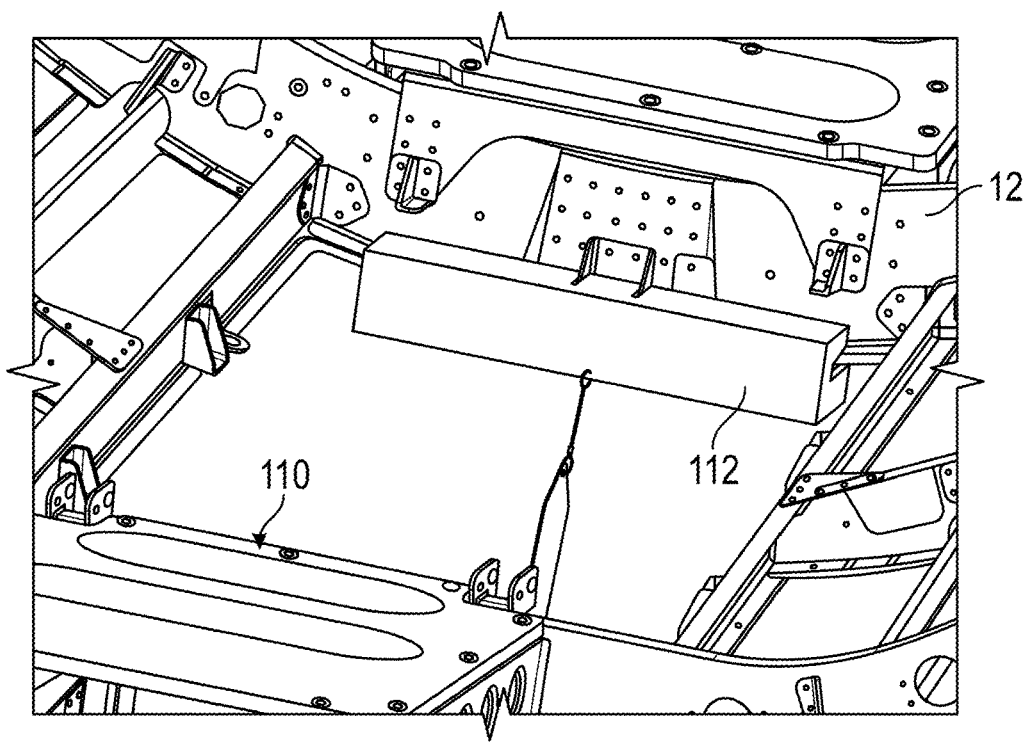
FIG. 13 is a fragmentary perspective view illustrating an opening to an exterior of the aircraft.

FIG. 12 is a perspective view illustrating the shelf 104 of FIG. 11. The shelf 104 includes two arms 106 opposite each other extending to distal ends. The arms 106 are configured to engage the aircraft 10 for placement of the shelf 104 in the aircraft 10. Each of the arms 106 gradually increases in height in the direction of the distal ends. This gradual increase in height permits ease of movement of the load 92 from the shelf 104 to the aircraft 10, or from the aircraft 10 to the shelf 104. The shelf 104 has a surface 108 extending to the distal ends. The surface 108 of the shelf 104 has a low coefficient of friction for easing movement of the load 92 from the shelf 104 to the aircraft 10, or from the aircraft 10 to the shelf 104. In certain embodiments, the surface 108 of the shelf 104 includes a low-friction coating for reducing the coefficient of friction of the surface 108. In other embodiments, the shelf 104 is formed from a low-friction material for reducing the coefficient of friction of the surface 108.

With continuing reference to FIGS. 1-12, FIG. 13 is a fragmentary perspective view illustrating an opening 110 in a bottom surface of the aircraft 10 to an exterior of the aircraft 10. In certain embodiments, the opening 110 is inline with the first interior position 14 of the structural member 12 for lifting the load 92 from the exterior of the aircraft to the lifting sub-assembly 22, or lowering the load 92 to the exterior of the aircraft from the lifting sub-assembly 22, when the lifting sub-assembly 22 is in the first interior position 14. The load assembly 18 further includes a protective layer 112 configured to engage the aircraft 10 adjacent the opening 110 for minimizing damage to the aircraft 10 by the load assembly 18. Specifically, the protective layer 112 is disposed between the aircraft 10 and the cable 82 when the load 92 is lifted into the aircraft 10 or lowered to the exterior of the aircraft 10 to prevent contact between the aircraft 10 and the cable 82, or the aircraft 10 and the load 92. However, it is to be appreciated the that the protective layer 112 may be utilized in any location throughout the aircraft 10 to prevent contact between the aircraft 10 and any component of the load assembly 18.

Figure 14A:
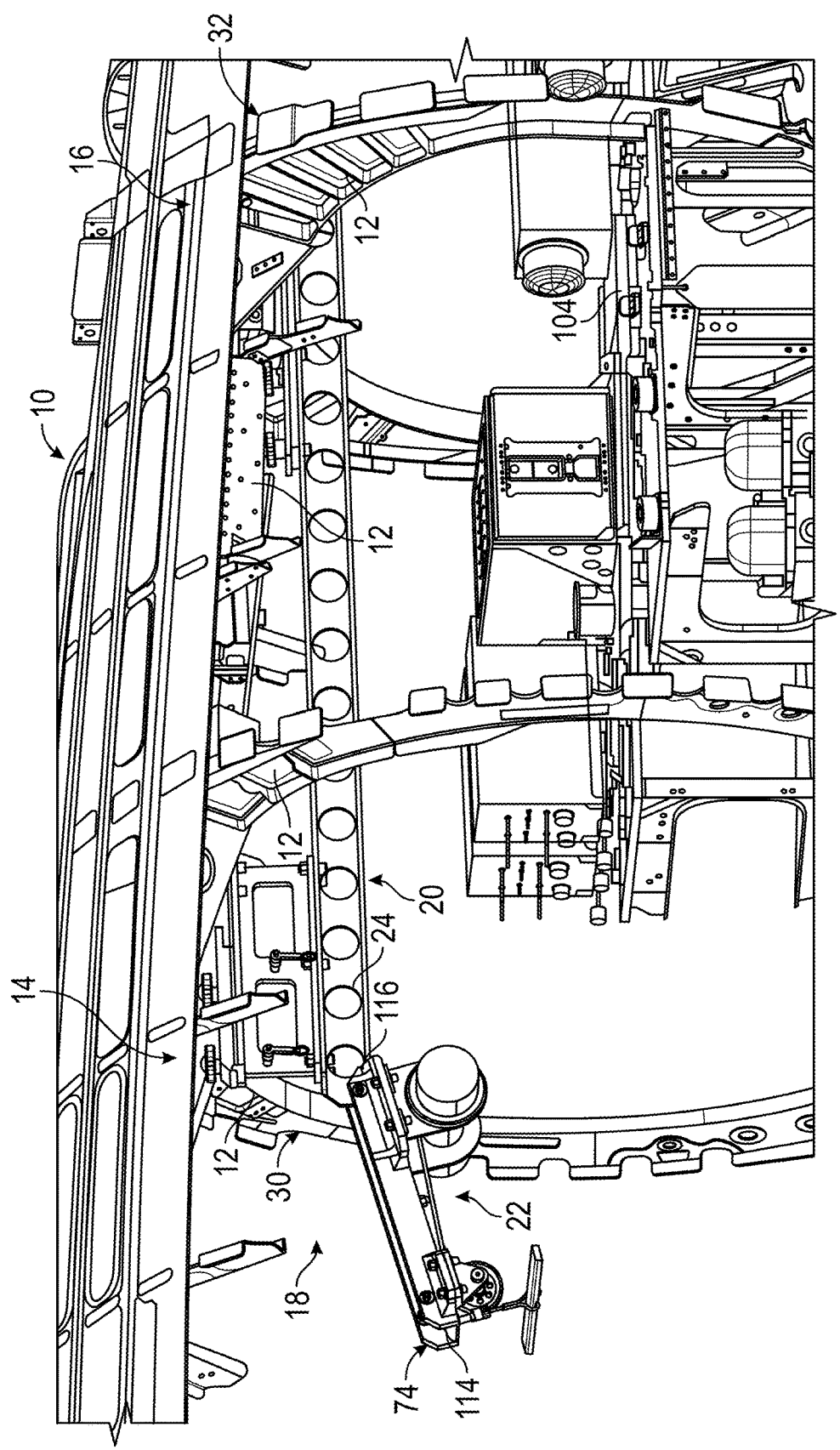
FIGS. 14A, 14B, 14C, and 14D are fragmentary perspective views illustrating the method of positioning the lifting sub-assembly onto the support sub-assembly of the load assembly of FIGS. 1 and 5.
Figure 14B:
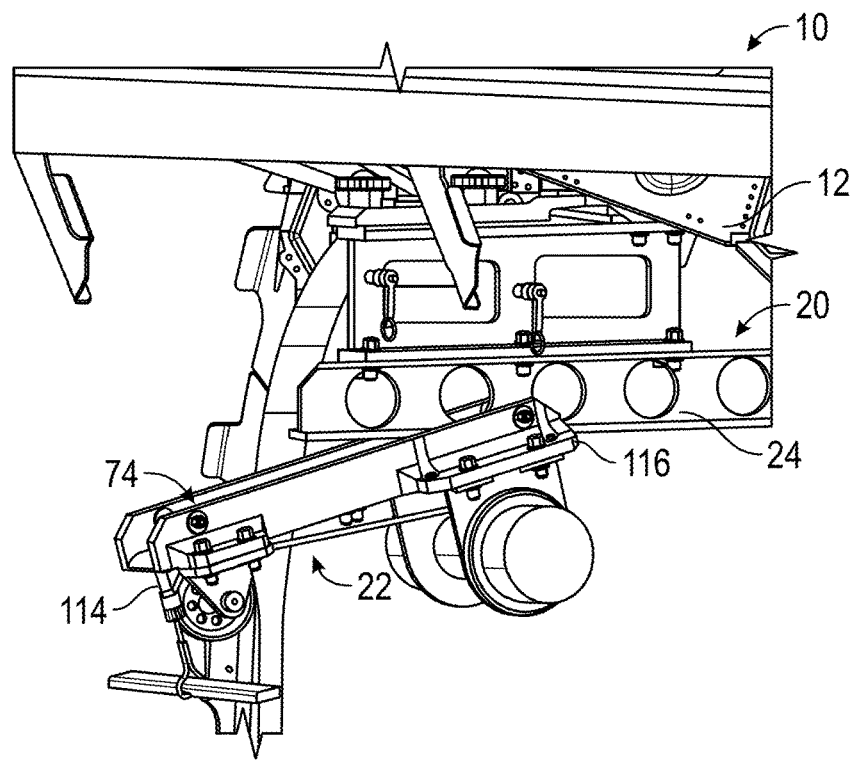
Figure 14C:
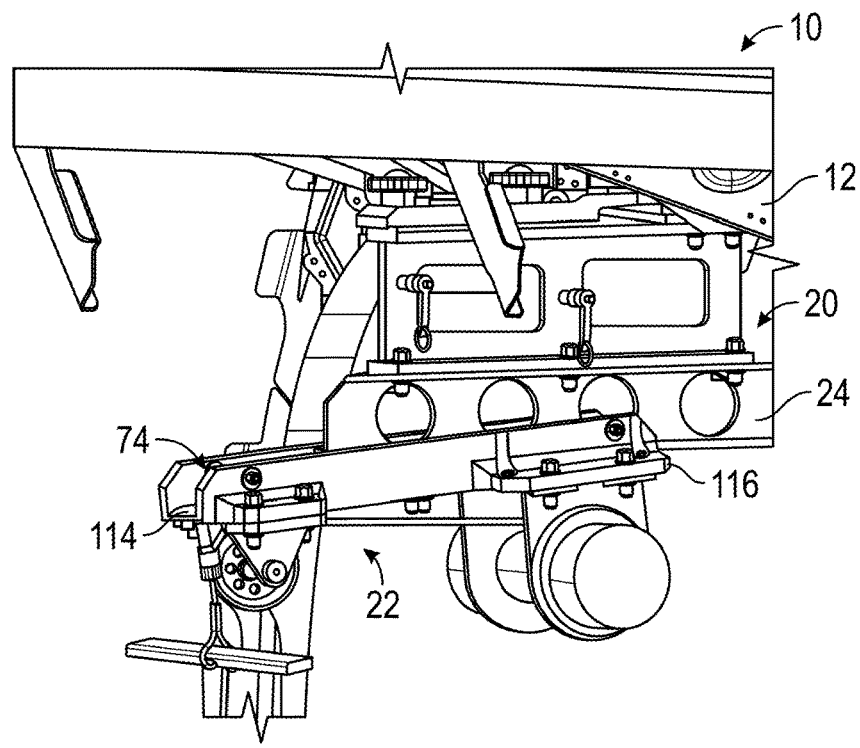
Figure 14D:
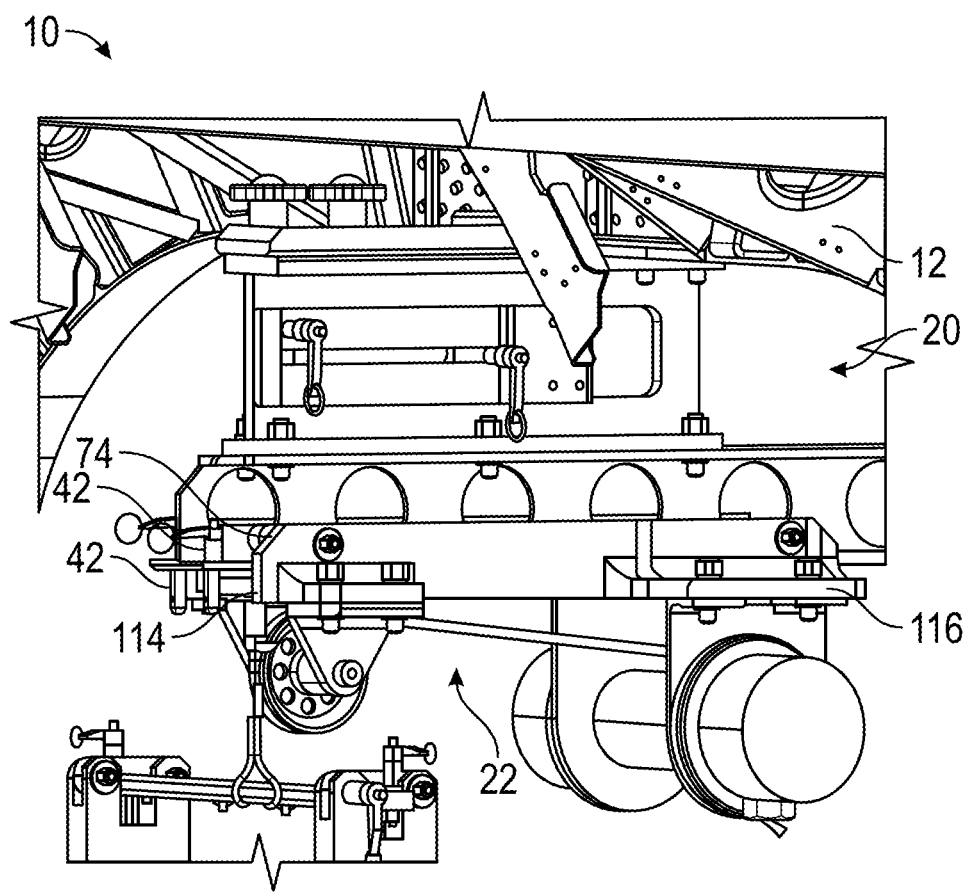

FIGS. 14A, 14B, 14C, and 14D are fragmentary perspective views illustrating the method of utilizing the load assembly 18 in the aft section of the aircraft 10. As illustrated in FIG. 14A, the method includes the step of coupling the support sub-assembly 20 to the structural member 12 of the aircraft 10. This step may be further defined as the step of coupling the beam portion 24 and the fixed spacer portion 26 to the structural member 12 of the aircraft 10.

The method also includes the step of coupling the lifting sub-assembly 22 to the support sub-assembly 20 in the aft section of the aircraft 10. As illustrated in the transition from FIGS. 14A to 14B, from 14B to 14C, and from 14C to 14D, this step may include the step of engaging the first beam end 30 of the beam portion 24 of the support sub-assembly 20 with the second cart end 116 of the cart 74, and may then include the step of engaging the first beam end 30 with the first cart end 114 of the cart 74. In certain embodiments, the step of coupling the lifting sub-assembly 22 to the support sub-assembly 20 in the aft section of the aircraft 10 may include the step of engaging the first beam end 30 of the beam portion 24 of the support sub-assembly 20 with the gliders 76 of the second cart end 116 of the cart 74, and may then include the step of engaging the first beam end 30 with the gliders 76 of the first cart end 114 of the cart 74.

Although not illustrated, in the second non-limiting embodiment of the load assembly 18 for utilizing the load assembly 18 in the forward section of the aircraft 10, the step of coupling the support sub-assembly 20 to the structural member 12 of the aircraft 10 includes the step of coupling the forward extender 62 and the aft extender 64 to the structural member 12 and the step of coupling the support sub-assembly 20 to the forward extender 62 and the aft extender 64.

The method also includes the step of coupling the lifting sub-assembly 22 to the support sub-assembly 20 in the forward section of the aircraft 10. This step may include the step of engaging the second beam end 32 of the beam portion 24 of the support sub-assembly 20 with the first cart end 114 of the cart 74, and may then include the step of engaging the second beam end 32 with the second cart end 116 of the cart 74. In certain embodiments, the step of coupling the lifting sub-assembly 22 to the support sub-assembly 20 in the forward section of the aircraft 10 may include the step of engaging the second beam end 32 of the beam portion 24 of the support sub-assembly 20 with the gliders 76 of the second cart end 116 of the cart 74, and may then include the step of engaging the second beam end 32 with the gliders 76 of the first cart end 114 of the cart 74.

Figure 15A:
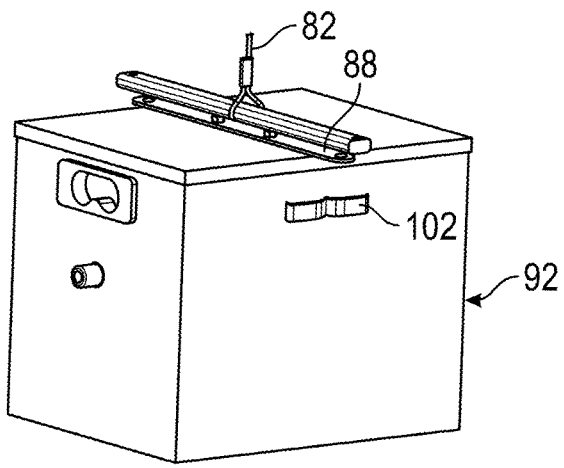
FIGS. 15A, 15B, and 15C are perspective views illustrating a step of coupling a load to the lifting sub-assembly.
Figure 15B:
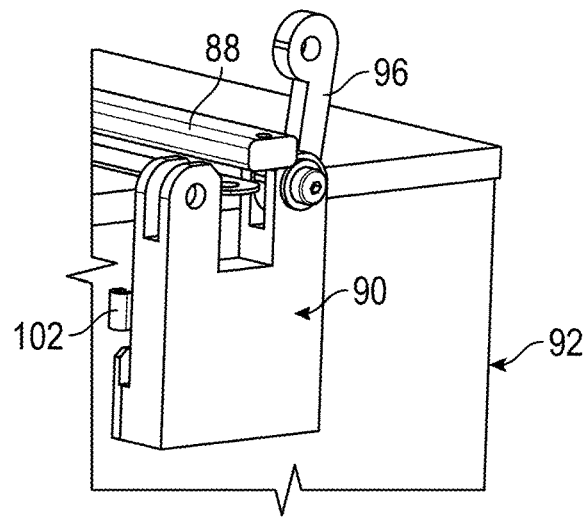
Figure 15C:
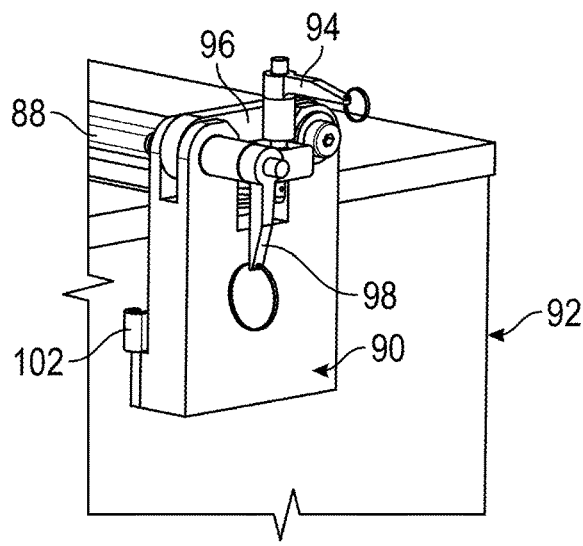

FIGS. 15A, 15B, and 15C are perspective views illustrating the step of coupling the load 92 to the lifting sub-assembly 22 either in the aft section or the forward section of the aircraft 10. As illustrated in the transition from FIGS. 15A to 15B and from 15B to 15C, this step may include the step of disposing the cable bar 88 on the load 92, the step of coupling the joining device 90 to the load 92, and the step of coupling the cable bar 88 to the joining device 90.

Figure 16A:
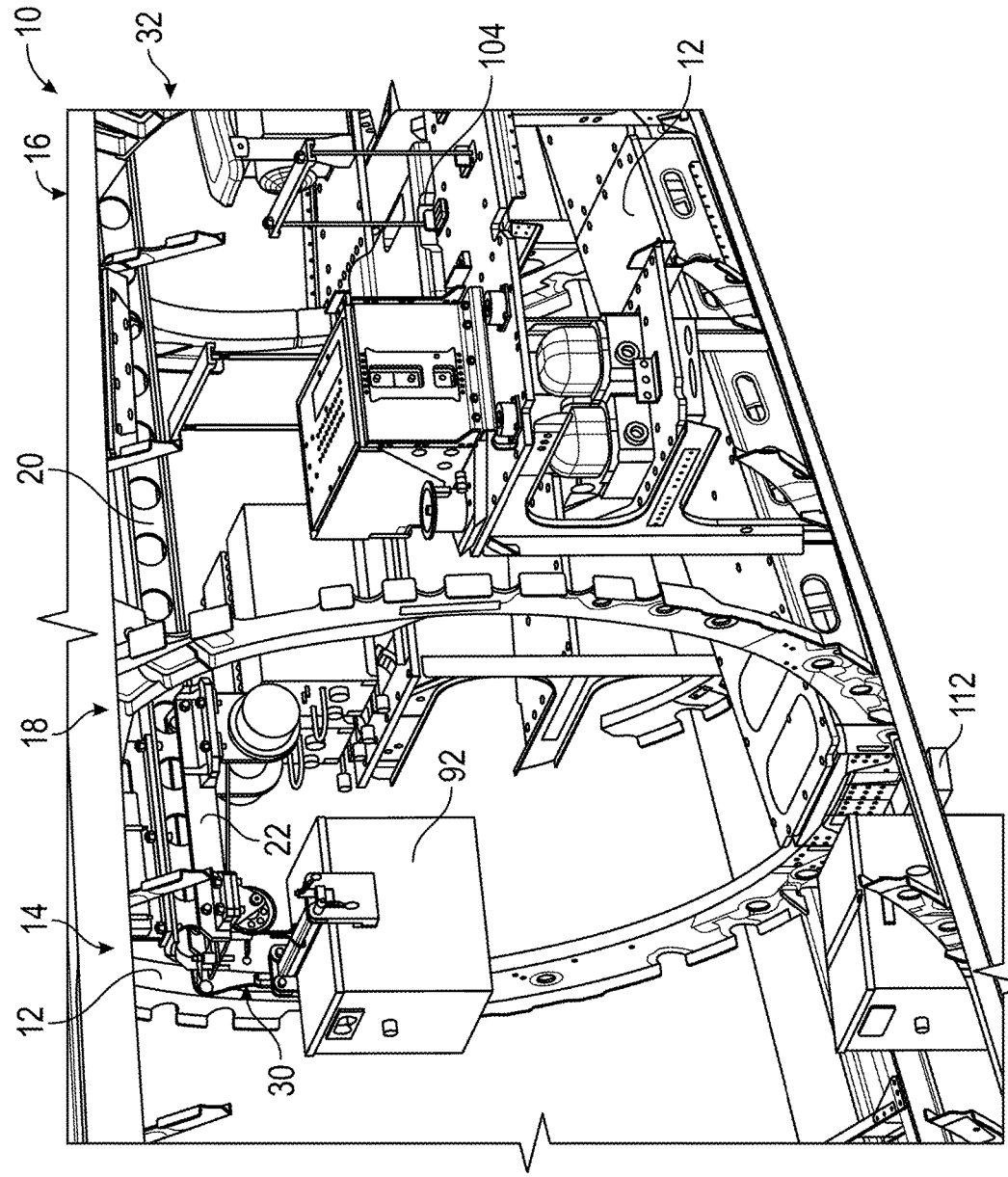

FIG. 16A is a fragmentary perspective view illustrating the step of activating the lifting sub-assembly 22 to lift the load 92 in the aft section of the aircraft 10. This step may be further defined as the step of activating the lifting sub-assembly 22 to lift the load from the exterior of the aircraft 10. Although not illustrated, the step of activating the lifting sub-assembly 22 to lift the load 92 may be further defined as the step of activating the lifting sub-assembly 22 to lift the load 92 from the interior surface of the aircraft 10.

The method also includes the step of moving the lifting sub-assembly 22 from the first interior position 14 to the second interior position 16. In one embodiment, the first interior position 14 is inline with the opening 110 defined by the aircraft 10 and the second interior position 16 is inline with the interior surface of the aircraft 10. In another embodiment, the first interior position 14 is inline with the interior surface of the aircraft 10 and the second interior position 16 is inline with the opening 110 defined by the aircraft 10.

FIG. 16B is a fragmentary perspective view illustrating the step of activating the lifting sub-assembly 22 to lower the load 92 in the aft section of the aircraft 10. This step may be further defined as the step of activating the lifting sub-assembly 22 to lower the load to the interior surface of the aircraft 10. Although not illustrated, the step of activating the lifting sub-assembly 22 to lower the load 92 may be further defined as activating the lifting sub-assembly 22 to lower the load 92 to the exterior of the aircraft 10.

Figure 17A:
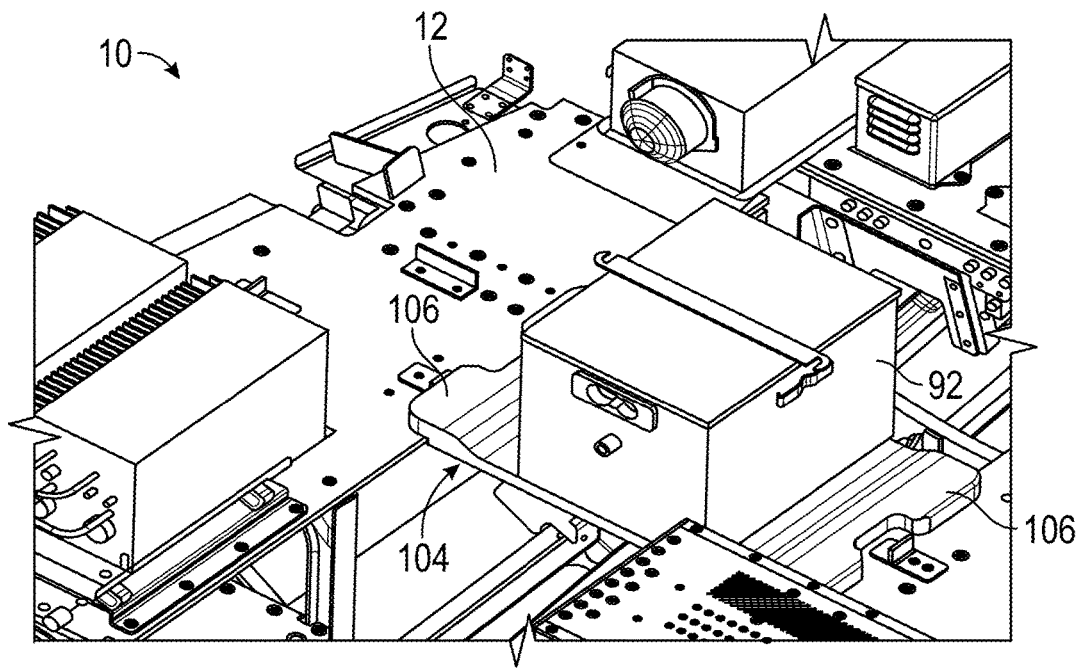
FIGS. 17A, 17B, and 17C are fragmentary perspective views illustrating a steps of moving the load in an aft section of the aircraft from the shelf to an interior surface of the aircraft.
Figure 17B:
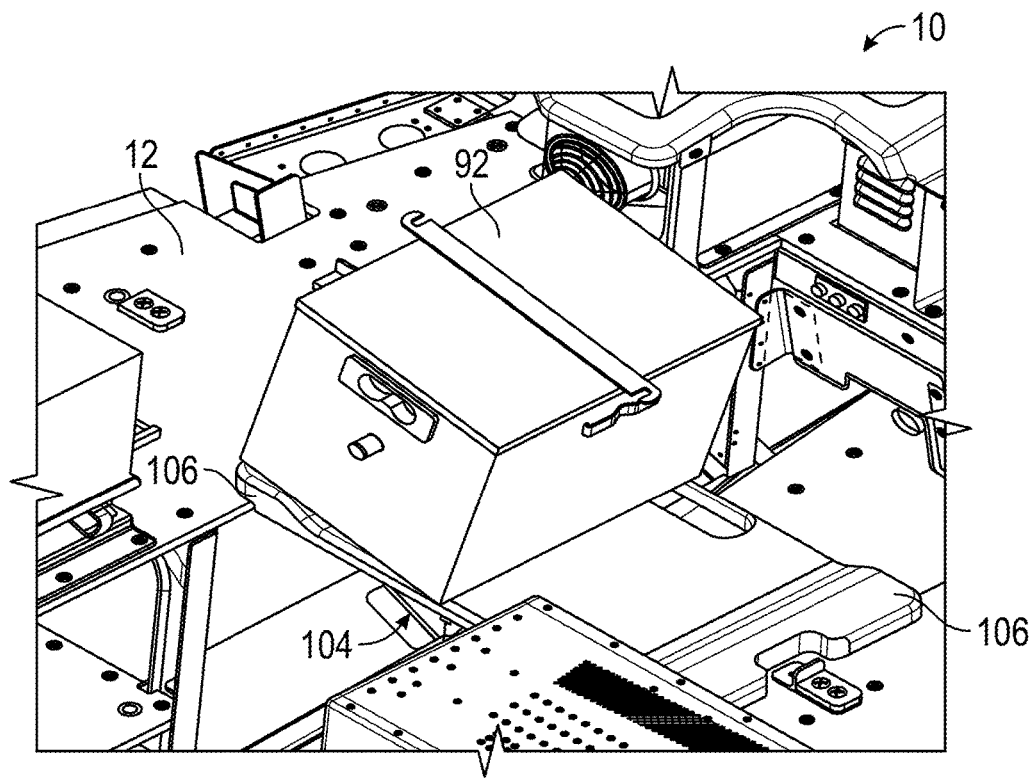
Figure 17C:
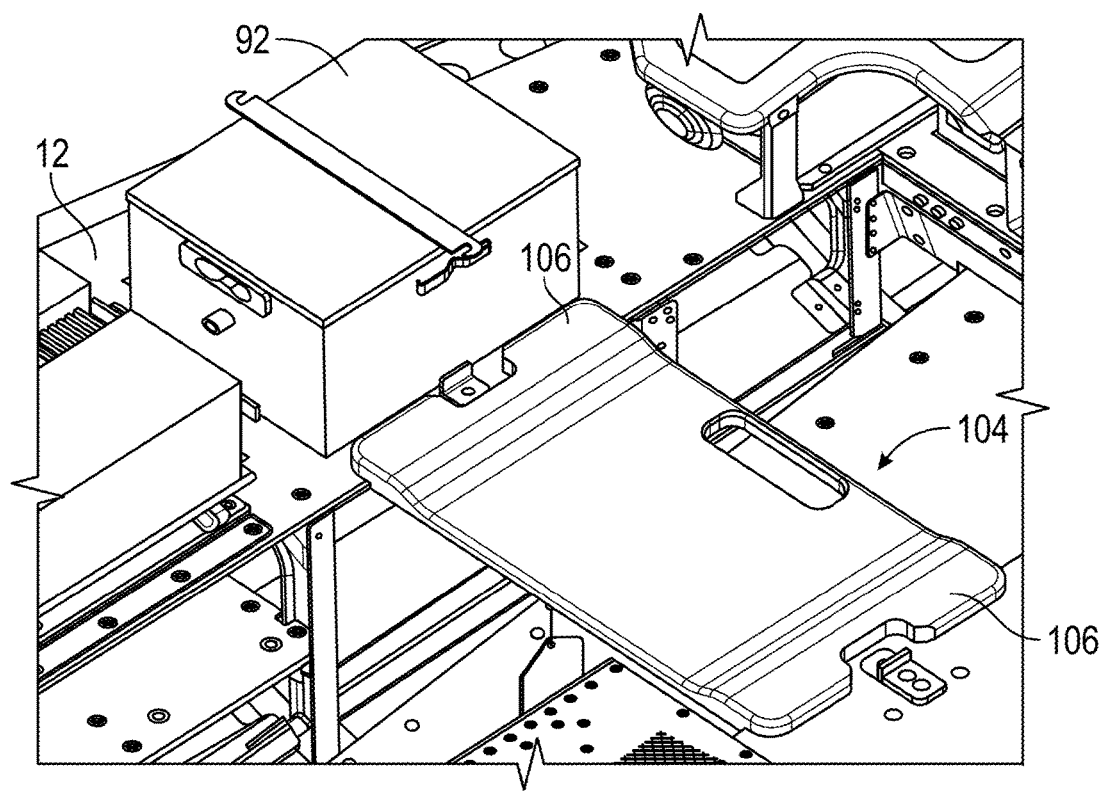

FIGS. 17A, 17B, and 17C are fragmentary perspective views illustrating the step of moving the load 92 from the shelf 104 to the interior surface of the aircraft 10. As illustrated in 17A, the load 92 is disposed on the shelf 104. As illustrated in 17B, the load 92 is moved to one of the arms 106 of the shelf 104. As illustrated in 17C, the load 92 is moved from one of the arms 106 of the shelf 104 to the interior surface of the aircraft 10.

Figure 18A:
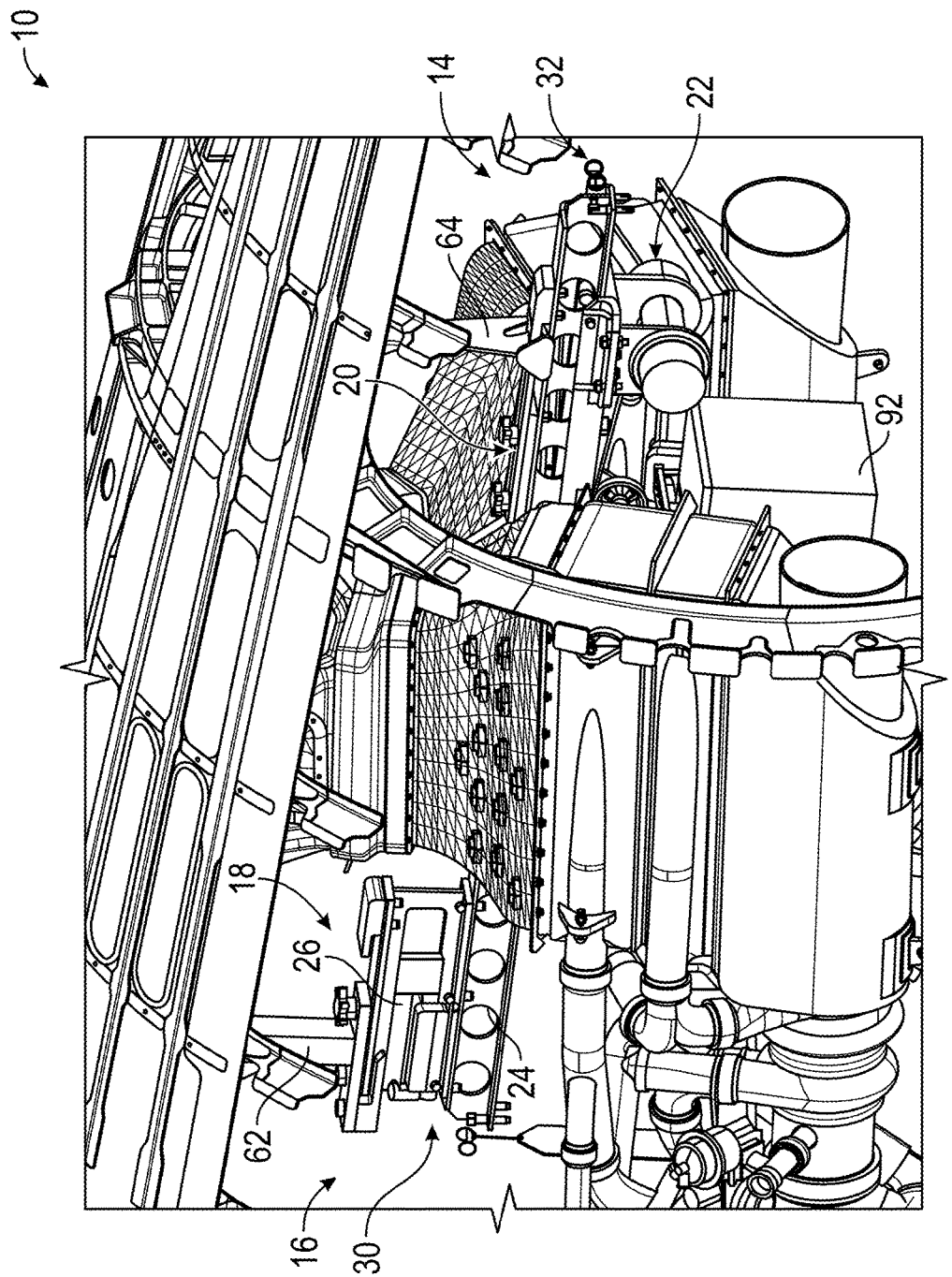
FIGS. 18A and 18B are fragmentary perspective views of the second non-limiting embodiment of FIG. 5 illustrating the steps of activating the lifting sub-assembly in a forward section of the aircraft.

FIG. 18A is a fragmentary perspective view looking toward the forward section of the aircraft 10 illustrating the step of activating the lifting sub-assembly 22 to lift the load 92 in the forward section of the aircraft 10. This step may be further defined as the step of activating the lifting sub-assembly 22 to lift the load 92 from the exterior of the aircraft 10. Although not illustrated, the step of activating the lifting sub-assembly 22 to lift the load 92 may be further defined as the step of activating the lifting sub-assembly 22 to lift the load 92 from the interior surface of the aircraft 10.

The method also includes the step of moving the lifting sub-assembly 22 from the first interior position 14 to the second interior position 16. In one embodiment, the first interior position 14 is inline with the opening 110 defined by the aircraft 10 and the second interior position 16 is inline with the interior surface of the aircraft 10. In another embodiment, the first interior position 14 is inline with the interior surface of the aircraft 10 and the second interior position 16 is inline with the opening 110 defined by the aircraft 10.

Figure 18B:
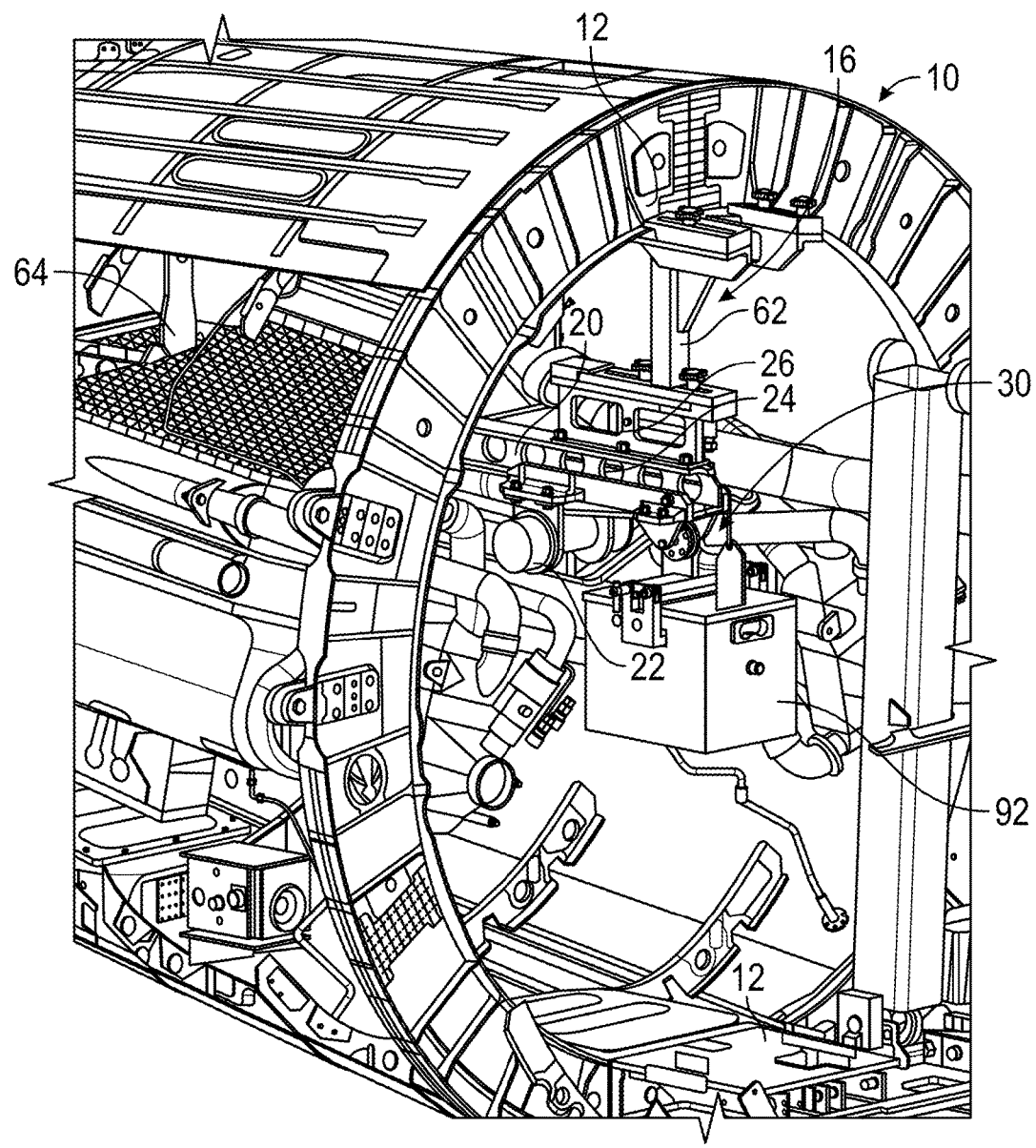

FIG. 18B is a fragmentary perspective view looking toward the aft section of the aircraft 10 illustrating the step of activating the lifting sub-assembly 22 to lower the load 92 in the forward section of the aircraft 10. This step may be further defined as the step of activating the lifting sub-assembly 22 to lower the load to the interior surface of the aircraft. Although not illustrated, the step of activating the lifting sub-assembly 22 to lower the load 92 may be further defined as activating the lifting sub-assembly 22 to lower the load 92 to the exterior of the aircraft 10.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the disclosure as set forth in the appended claims.

What is claimed is:

1. A load assembly for use with an aircraft, the load assembly comprising:
   a support sub-assembly configured for removable coupling to a structural member of the aircraft, the structural member having a first interior position and a second interior position, the support sub-assembly extending between the first interior position and the second interior position, wherein the support sub-assembly comprises one or more retainer clamps including a forward retainer clamp and an aft retainer clamp configured to engage the structural member of the aircraft for removable coupling the support sub-assembly to the structural member of the aircraft, and wherein the support sub-assembly comprises a beam portion and a fixed spacer portion extending transversely from the beam portion, the fixed spacer portion comprises the forward retainer clamp and the beam portion comprises the aft retainer clamp; and
   a lifting sub-assembly movably coupled to the support sub-assembly, the lifting sub-assembly movable along the support sub-assembly between the first interior position and the second interior position and configured to lift or lower a load and to support the load as the lifting sub-assembly moves along the support sub-assembly between the first interior position and the second interior position.

2. The load assembly of claim 1, wherein each of the one or more retainer clamps comprises an adjustable clamp portion and a fixed clamp portion, the adjustable and the fixed clamp portions configured to engage opposing sides of the structural member of the aircraft.

3. The load assembly of claim 1, wherein the support sub-assembly comprises a forward extender and an aft extender, the forward extender configured to engage the forward retainer clamp for removable coupling the forward extender to the fixed spacer portion, and the aft extender configured to engage the aft retainer clamp for removable coupling the aft extender to the beam portion.

4. The load assembly of claim 3, wherein the forward extender comprises a forward extender retainer clamp for removably coupling the forward extender to the structural member of the aircraft, and the aft extender comprises an aft extender retainer clamp for removably coupling the aft extender to the structural member of the aircraft.

5. The load assembly of claim 1, wherein the lifting sub-assembly comprises a cart comprising a plurality of gliders with the gliders configured to engage the support sub-assembly such that the cart is movable along the support sub-assembly between the first interior position and the second interior position.

6. The load assembly of claim 5, wherein the lifting sub-assembly further comprises:
   a winch coupled to the cart;
   a cable having a first cable end and a second cable end, the first cable end coupled to the winch;
   a pulley coupled to the cart, the second cable end of the cable extending through the pulley; and
   a cable bar coupled to the second cable end such that the cable bar is coupled to the winch.

7. The load assembly of claim 6 wherein the lifting sub-assembly further comprises a joining device removably coupled to the cable bar, the joining device configured for removable coupling to the load.

8. The load assembly of claim 1 further comprising a shelf for supporting the load, the shelf having surface extending to distal ends, the surface having a low coefficient of friction.

* * * * *